(12) United States Patent
McNamer et al.

(10) Patent No.: US 9,185,388 B2
(45) Date of Patent: Nov. 10, 2015

(54) METHODS, SYSTEMS, AND COMPUTER PROGRAM PRODUCTS FOR CREATING THREE-DIMENSIONAL VIDEO SEQUENCES

(75) Inventors: Michael McNamer, Apex, NC (US); Tassos Markas, Chapel Hill, NC (US)

(73) Assignee: 3DMedia Corporation, Durham, NC (US)

( * ) Notice: Subject to any disclaimer, the term of this patent is extended or adjusted under 35 U.S.C. 154(b) by 533 days.

(21) Appl. No.: 13/288,209

(22) Filed: Nov. 3, 2011

(65) Prior Publication Data

US 2012/0105602 A1    May 3, 2012

Related U.S. Application Data

(60) Provisional application No. 61/409,664, filed on Nov. 3, 2010.

(51) Int. Cl.
*H04N 13/02* (2006.01)
*H04N 13/00* (2006.01)
*G06T 7/00* (2006.01)

(52) U.S. Cl.
CPC .......... *H04N 13/0207* (2013.01); *G06T 7/0065* (2013.01); *H04N 13/0022* (2013.01); *H04N 13/0037* (2013.01); *G06T 2207/10016* (2013.01); *G06T 2207/10024* (2013.01)

(58) Field of Classification Search
USPC .......................................................... 340/50
See application file for complete search history.

(56) References Cited

U.S. PATENT DOCUMENTS

| 3,503,316 A | 3/1970 | Takano |
| 3,953,869 A | 4/1976 | Wah Lo |
| 4,661,986 A | 4/1987 | Adelson |
| 4,956,705 A | 9/1990 | Wright |

(Continued)

FOREIGN PATENT DOCUMENTS

| EP | 1056049 A2 | 11/2000 |
| EP | 1240540 B1 | 2/2011 |

(Continued)

OTHER PUBLICATIONS

Int'l. Search Report and Written Opinion mailed Sep. 7, 2012 for related application PCT/US2011/067349 filed Dec. 27, 2011 and published as WO2012/092246 on Jul. 5, 2012.

(Continued)

*Primary Examiner* — Dave Czekaj
*Assistant Examiner* — Kehinde O Abimbola
(74) *Attorney, Agent, or Firm* — Olive Law Group PLLC

(57) ABSTRACT

Methods and systems for creating three-dimensional video sequences of a scene are disclosed. An example method can include receiving multiple frames of a scene. The method may include selecting a target frame from among the multiple frames; selecting a first subset of frames, N, from among the multiple frames that are associated with the target frame that is representative of a large stereo baseline; and analyzing the first frame subset to identify two images for forming a stereoscopic pair of frames. Further, the method includes extracting depth data of static objects in the stereoscopic pair. The method includes selecting a second subset of frames that are associated with the target frame that is representative of a smaller stereo baseline than that represented by N; and utilizing the second frame subset to calculate depth of moving objects. The method includes generating a three-dimensional video frame based on the depth data.

34 Claims, 13 Drawing Sheets

(56) References Cited

U.S. PATENT DOCUMENTS

| | | |
|---|---|---|
| 4,980,762 A | 12/1990 | Heeger |
| 5,043,806 A | 8/1991 | Choquet |
| 5,151,609 A | 9/1992 | Nakagawa |
| 5,305,092 A | 4/1994 | Mimura |
| 5,369,735 A | 11/1994 | Thier |
| 5,444,479 A | 8/1995 | Femekes |
| 5,511,153 A | 4/1996 | Azabayejani |
| 5,603,687 A | 2/1997 | Hori |
| 5,613,048 A | 3/1997 | Chen |
| 5,652,616 A | 7/1997 | Chen |
| 5,673,081 A | 9/1997 | Yamashita |
| 5,678,089 A | 10/1997 | Bacs, Jr. |
| 5,682,437 A | 10/1997 | Okino |
| 5,719,954 A | 2/1998 | Onda |
| 5,734,743 A | 3/1998 | Matsugu |
| 5,748,199 A | 5/1998 | Palm |
| 5,777,666 A | 7/1998 | Tanase |
| 5,808,664 A | 9/1998 | Yamashita |
| 5,874,988 A | 2/1999 | Gu |
| 5,883,695 A | 3/1999 | Paul |
| 5,953,054 A | 9/1999 | Mercier |
| 5,963,247 A | 10/1999 | Banitt |
| 5,991,551 A | 11/1999 | Bacs, Jr. |
| 6,018,349 A | 1/2000 | Szeliski |
| 6,023,588 A | 2/2000 | Ray |
| 6,031,538 A | 2/2000 | Chupeau |
| 6,047,078 A | 4/2000 | Kang |
| 6,064,759 A | 5/2000 | Buckley |
| 6,075,905 A | 6/2000 | Herman |
| 6,094,215 A | 7/2000 | Sundahl |
| 6,215,516 B1 | 4/2001 | Ma |
| 6,240,198 B1 | 5/2001 | Rehg |
| 6,246,412 B1 | 6/2001 | Shum |
| 6,269,172 B1 | 7/2001 | Rehg |
| 6,278,460 B1 | 8/2001 | Myers |
| 6,314,211 B1 | 11/2001 | Kim |
| 6,324,347 B1 | 11/2001 | Bacs, Jr. |
| 6,381,302 B1 | 4/2002 | Berestov |
| 6,384,859 B1 | 5/2002 | Matsumoto |
| 6,385,334 B1 | 5/2002 | Saneyoshi |
| 6,414,709 B1 | 7/2002 | Palm |
| 6,434,278 B1 | 8/2002 | Hashimoto |
| 6,445,833 B1 | 9/2002 | Murata |
| 6,496,598 B1 | 12/2002 | Harman |
| 6,512,892 B1 | 1/2003 | Montgomery |
| 6,556,704 B1 | 4/2003 | Chen |
| 6,559,846 B1 | 5/2003 | Uyttendaele |
| 6,611,268 B1 | 8/2003 | Szeliski |
| 6,661,913 B1 | 12/2003 | Zhang |
| 6,677,981 B1 | 1/2004 | Mancuso |
| 6,677,982 B1 | 1/2004 | Chen |
| 6,686,926 B1 | 2/2004 | Kaye |
| 6,747,610 B1 | 6/2004 | Taima |
| 6,750,904 B1 | 6/2004 | Lambert |
| 6,760,488 B1 | 7/2004 | Moura |
| 6,798,406 B1 | 9/2004 | Jones |
| 6,862,364 B1 | 3/2005 | Berestov |
| 6,927,769 B2 | 8/2005 | Roche, Jr. |
| 6,947,059 B2 | 9/2005 | Pierce |
| 6,967,659 B1 | 11/2005 | Jayavant |
| 6,970,591 B1 | 11/2005 | Lyons |
| 6,978,051 B2 | 12/2005 | Edwards |
| 7,027,642 B2 | 4/2006 | Rubbert |
| 7,046,840 B2 | 5/2006 | Chang et al. |
| 7,054,478 B2 | 5/2006 | Harman |
| 7,068,275 B2 | 6/2006 | Nakamura |
| 7,081,892 B2 | 7/2006 | Alkouh |
| 7,103,213 B2 | 9/2006 | Hirvonen |
| 7,108,657 B2 | 9/2006 | Irion |
| 7,116,323 B2 | 10/2006 | Kaye |
| 7,116,324 B2 | 10/2006 | Kaye |
| 7,126,598 B2 | 10/2006 | Oh |
| 7,164,790 B2 | 1/2007 | Zhang |
| 7,180,536 B2 | 2/2007 | Wolowelsky |
| 7,181,061 B2 | 2/2007 | Kawano |
| 7,196,730 B2 | 3/2007 | Mihelcic |
| 7,197,192 B2 | 3/2007 | Edwards |
| 7,203,356 B2 | 4/2007 | Gokturk |
| 7,215,809 B2 | 5/2007 | Sato |
| 7,218,757 B2 | 5/2007 | Franz |
| 7,224,357 B2 | 5/2007 | Chen |
| 7,224,382 B2 | 5/2007 | Baker |
| 7,245,768 B1 | 7/2007 | Harman |
| 7,260,243 B2 | 8/2007 | Shibayama |
| 7,321,374 B2 | 1/2008 | Naske |
| 7,349,006 B2 | 3/2008 | Sato |
| 7,373,017 B2 | 5/2008 | Edwards |
| 7,397,481 B2 | 7/2008 | Endo |
| 7,400,782 B2 | 7/2008 | Zhou |
| 7,409,105 B2 | 8/2008 | Jin |
| 7,466,336 B2 | 12/2008 | Regan |
| 7,483,590 B2 | 1/2009 | Nielsen |
| 7,489,812 B2 | 2/2009 | Fox |
| 7,508,977 B2 | 3/2009 | Lyons |
| 7,512,883 B2 | 3/2009 | Wallick |
| 7,515,759 B2 | 4/2009 | Sun |
| 7,522,186 B2* | 4/2009 | Arpa et al. ............... 348/153 |
| 7,538,876 B2 | 5/2009 | Hewitt |
| 7,551,770 B2 | 6/2009 | Harman |
| 7,557,824 B2 | 7/2009 | Holliman |
| 7,573,475 B2 | 8/2009 | Sullivan |
| 7,573,489 B2 | 8/2009 | Davidson |
| 7,580,463 B2 | 8/2009 | Routhier |
| 7,605,776 B2 | 10/2009 | Satoh |
| 7,616,886 B2 | 11/2009 | Matsumura |
| 7,619,656 B2 | 11/2009 | Ben-Ezra |
| 7,639,838 B2 | 12/2009 | Nims |
| 7,643,062 B2 | 1/2010 | Silverstein |
| 7,680,323 B1 | 3/2010 | Nichani |
| 7,693,221 B2 | 4/2010 | Routhier |
| 7,701,506 B2 | 4/2010 | Silverbrook |
| 7,705,970 B2 | 4/2010 | Piestun |
| 7,711,181 B2 | 5/2010 | Kee |
| 7,711,201 B2 | 5/2010 | Wong |
| 7,711,221 B2 | 5/2010 | Burgi |
| 7,768,702 B2 | 8/2010 | Hirose |
| 7,817,187 B2 | 10/2010 | Silsby |
| 7,844,001 B2 | 11/2010 | Routhier |
| 7,857,455 B2 | 12/2010 | Cowen |
| 7,873,207 B2 | 1/2011 | Tsubaki |
| 7,876,948 B2 | 1/2011 | Wetzel |
| 2002/0106120 A1 | 8/2002 | Brandenburg |
| 2002/0158873 A1 | 10/2002 | Williamson |
| 2002/0176497 A1* | 11/2002 | Harada et al. ............ 375/240.12 |
| 2002/0181585 A1* | 12/2002 | Harada ..................... 375/240.03 |
| 2002/0190991 A1 | 12/2002 | Efran |
| 2002/0191841 A1 | 12/2002 | Harman |
| 2003/0002870 A1 | 1/2003 | Baron |
| 2003/0030636 A1 | 2/2003 | Yamaoka |
| 2003/0085992 A1* | 5/2003 | Arpa et al. ..................... 348/47 |
| 2003/0151659 A1 | 8/2003 | Kawano |
| 2003/0152264 A1 | 8/2003 | Perkins |
| 2004/0100565 A1 | 5/2004 | Chen |
| 2004/0136571 A1 | 7/2004 | Hewitson |
| 2004/0218269 A1 | 11/2004 | Divelbiss |
| 2005/0041123 A1 | 2/2005 | Ansari |
| 2005/0201612 A1 | 9/2005 | Park et al. |
| 2006/0008268 A1 | 1/2006 | Suwa |
| 2006/0203335 A1 | 9/2006 | Martin |
| 2006/0210111 A1 | 9/2006 | Cleveland |
| 2006/0221072 A1 | 10/2006 | Se |
| 2006/0221179 A1 | 10/2006 | Seo et al. |
| 2006/0222260 A1 | 10/2006 | Sambongi |
| 2007/0024614 A1 | 2/2007 | Tam |
| 2007/0047040 A1 | 3/2007 | Ha |
| 2007/0064098 A1 | 3/2007 | Tran |
| 2007/0127809 A1* | 6/2007 | Leach et al. ................. 382/154 |
| 2007/0146232 A1 | 6/2007 | Redert |
| 2007/0165129 A1 | 7/2007 | Hill et al. |
| 2007/0165942 A1 | 7/2007 | Jin |
| 2007/0168820 A1 | 7/2007 | Kutz |
| 2007/0189599 A1 | 8/2007 | Ryu et al. |
| 2007/0189747 A1 | 8/2007 | Ujisato |
| 2007/0236561 A1* | 10/2007 | Anai et al. ..................... 348/46 |

(56) References Cited

U.S. PATENT DOCUMENTS

| | | |
|---|---|---|
| 2007/0291143 A1 | 12/2007 | Barbieri |
| 2008/0024614 A1 | 1/2008 | Li et al. |
| 2008/0031327 A1 | 2/2008 | Wang |
| 2008/0056609 A1 | 3/2008 | Rouge |
| 2008/0062254 A1 | 3/2008 | Edwards |
| 2008/0080852 A1 | 4/2008 | Chen |
| 2008/0117289 A1 | 5/2008 | Schowengerdt et al. |
| 2008/0150945 A1 | 6/2008 | Wang |
| 2008/0158345 A1 | 7/2008 | Schklair |
| 2008/0180550 A1 | 7/2008 | Gulliksson |
| 2008/0240607 A1 | 10/2008 | Sun |
| 2008/0252725 A1 | 10/2008 | Lanfermann |
| 2008/0317379 A1 | 12/2008 | Steinberg |
| 2009/0061381 A1 | 3/2009 | Durbin |
| 2009/0080036 A1 | 3/2009 | Paterson |
| 2009/0116732 A1 | 5/2009 | Zhou et al. |
| 2009/0141967 A1 | 6/2009 | Hattori |
| 2009/0154793 A1 | 6/2009 | Shin |
| 2009/0154823 A1 | 6/2009 | Ben-Ezra |
| 2009/0290013 A1 | 11/2009 | Hayashi |
| 2009/0290037 A1 | 11/2009 | Pore |
| 2009/0295907 A1 | 12/2009 | Kim |
| 2009/0309878 A1* | 12/2009 | Otani et al. .................. 345/427 |
| 2010/0013909 A1* | 1/2010 | Zhang et al. .................. 348/50 |
| 2010/0030502 A1 | 2/2010 | Higgins |
| 2010/0097444 A1 | 4/2010 | Lablans |
| 2010/0128109 A1 | 5/2010 | Banks |
| 2010/0134598 A1 | 6/2010 | St. Pierre |
| 2010/0142824 A1 | 6/2010 | Lu |
| 2010/0149372 A1* | 6/2010 | Silverstein ................ 348/223.1 |
| 2010/0165152 A1 | 7/2010 | Lim |
| 2010/0182406 A1 | 7/2010 | Benitez |
| 2010/0208942 A1 | 8/2010 | Porter |
| 2010/0220932 A1 | 9/2010 | Zhang et al. |
| 2010/0231723 A1* | 9/2010 | Nam et al. .................. 348/169 |
| 2010/0238327 A1 | 9/2010 | Griffith |
| 2010/0239158 A1 | 9/2010 | Rouge |
| 2010/0309286 A1 | 12/2010 | Chen |
| 2010/0309288 A1 | 12/2010 | Stettner |
| 2011/0018975 A1 | 1/2011 | Chen |
| 2011/0025825 A1 | 2/2011 | McNamer |
| 2011/0025829 A1 | 2/2011 | McNamer |
| 2011/0025830 A1 | 2/2011 | McNamer |
| 2011/0050853 A1 | 3/2011 | Zhang |
| 2011/0050859 A1 | 3/2011 | Kimmel |
| 2011/0050864 A1 | 3/2011 | Bond |
| 2011/0169921 A1 | 7/2011 | Lee et al. |
| 2011/0205337 A1* | 8/2011 | Ganapathi et al. .............. 348/46 |
| 2011/0219339 A1* | 9/2011 | Densham ..................... 715/849 |
| 2011/0249072 A1* | 10/2011 | Marks ......................... 348/14.1 |
| 2011/0255775 A1* | 10/2011 | McNamer et al. ............ 382/154 |
| 2011/0273529 A1* | 11/2011 | Lai et al. ....................... 348/42 |
| 2012/0105602 A1 | 5/2012 | McNamer |
| 2012/0314036 A1 | 12/2012 | Dahi et al. |

FOREIGN PATENT DOCUMENTS

| | | |
|---|---|---|
| GB | 2405764 A | 3/2005 |
| GB | 2455316 A | 6/2008 |
| KR | 10-0653965 B1 | 12/2006 |
| WO | 96/15631 A1 | 5/1996 |
| WO | WO 2005/025239 A1 | 3/2005 |
| WO | WO 2006/062325 A1 | 6/2006 |
| WO | WO 2008/016882 A2 | 2/2008 |
| WO | 2008075276 A1 | 6/2008 |
| WO | WO 2008/075276 A1 | 6/2008 |
| WO | WO 2009/122200 A1 | 10/2009 |
| WO | 2010/024479 A1 | 3/2010 |
| WO | WO 2010/024479 A1 | 3/2010 |
| WO | 2010/052741 A1 | 5/2010 |
| WO | WO 2010/052741 A1 | 5/2010 |
| WO | WO 2010/147609 A1 | 12/2010 |
| WO | 2011017308 A1 | 2/2011 |
| WO | WO 2011/014419 A2 | 2/2011 |
| WO | WO 2011/014420 A2 | 2/2011 |
| WO | WO 2011/014421 A2 | 2/2011 |
| WO | WO 2011/017308 A1 | 2/2011 |

OTHER PUBLICATIONS

Joly, Phillippe et al., Efficient automatic analysis of camera work and microsegmentation of video using spatiotemporal images, 1996, Signal Process Image Communication, pp. 295-307.

Krotkov, Eric et al., An Agile Stereo Camera System for Flexible Image Acquisition, 1988, IEEE, vol. 4, pp. 108-113.

U.S. Non-Final Office Action dated Oct. 26, 2012 for Related U.S. Appl. No. 12/842,084, filed Jul. 23, 2010, references included herein.

U.S. Non-Final Office Action dated Nov. 26, 2012 for Related U.S. Appl. No. 12/842,171, filed Jul. 23, 2010, references included herein.

Notice of Allowance mailed Mar. 26, 2013 for related U.S. Appl. No. 12/842,171.

Related U.S. Appl. No. 13/865,127, filed Apr. 17, 2013; not yet public.

Related PCT Patent Application Serial No. PCT/US13/37010 filed Apr. 17, 2013; not yet public.

Related U.S. Appl. No. 13/865,312, filed Apr. 18, 2013; not yet public.

Mahajan et al., "Moving Gradients: A Path-Based Method for Plausible Image Interpolation", Proceedings of ACM SIGGRAPH 2009, vol. 28, Issue 3 (Aug. 2009).

Notice of Allowance mailed Apr. 9, 2013 for related U.S. Appl. No. 13/584,744.

Issue Notification mailed Apr. 24, 2013 for related U.S. Appl. No. 13/584,744.

Related U.S. Appl. No. 13/888,737, filed May 7, 2013; not yet public.

Non-Final Office Action mailed Dec. 5, 2012 for related U.S. Appl. No. 12/842,257 filed Jul. 23, 2010.

Related U.S. Appl. No. 13/662,443, filed Oct. 27, 2012; not yet public.

Related U.S. Appl. No. 13/751,203, filed Jan. 28, 2013; not yet public.

Applicant's Response filed Jan. 28, 2013 to U.S. Non-Final Office Action mailed Oct. 26, 2012 for related U.S. Appl. No. 12/842,084, filed Jul. 23, 2010.

Applicant-Initiated Interview Summary mailed Jan. 30, 2013 for related U.S. Appl. No. 12/842,084.

Applicant-Initiated Interview Summary mailed Feb. 8, 2013 for related U.S. Appl. No. 12/842,171.

Int'l Preliminary Report on Patentability mailed May 16, 2013, for related application No. PCT/US2011/059057 filed Nov. 3, 2011.

ISR and Written Opinion mailed Jul. 18, 2012 for related application PCT/US11/64050 filed Dec. 9, 2011 and published as WO2012/091878 on Jul. 5, 2012.

Related application: Bahram Dahi et al.; Primary and Auxiliary Image Capture Devices for Image Processing and Related Methods filed Aug. 13, 2012 as U.S. Appl. No. 13/584,744, not yet public.

Related application: Tassos Markas et al.; Methods, Systems, and Computer-Readable Storage Media for Identifying a Rough Depth Map in a Scene and for Determining a Stereo-Base Distance for Three-Dimensional (3D) Content Creation filed Dec. 27, 2011 as U.S. Appl. No. 13/337,676.

Related application: Bahram Dahi et al.; Primary and Auxiliary Image Capture Devices for Image Processing and Related Methods filed May 26, 2011 as U.S. Appl. No. 13/115,589 and corresponding non-final Office Action mailed Oct. 11, 2011 and Examiner Interview dated Oct. 11, 2011 and Applicant's response filed Nov. 9, 2011; and corresponding final rejection mailed Dec. 2, 2011 and amendment after final mailed by Applicant on Jan. 2, 2012; corresponding Applicant Initiated Interview summary dated Jan. 10, 2012; corresponding Advisory Action mailed Jan. 12, 2012; and Applicant's Request for Continued Examination filed Jan. 20, 2012.

Related application: Search Report and Written Opinion for PCT International Patent Application No. PCT/US10/43022 filed Jul. 23, 2010.

Related application: Search Report and Written Opinion for PCT International Patent Application No. PCT/US10/43023 filed Jul. 23, 2010.

(56) References Cited

OTHER PUBLICATIONS

Related application: Search Report and Written Opinion for PCT International Patent Application No. PCT/US10/43025 filed Jul. 23, 2010.

Related application: Michael McNamer et al.; Methods, Systems, and Computer Program Products for Creating Three-Dimensional Video Sequences filed Nov. 3, 2011 as PCT/US11/59057.

Related application: Tassos Markas et al.; Methods, Systems, and Computer-Readable Storage Media for Identifying a Rough Depth Map in a Scene and for Determining a Stereo-Base Distance for Three-Dimensional (3D) Content Creation filed Dec. 27, 2011 as PCT/US11/67349 (not yet published).

Related application: Bahram Dahi et al.; Primary and Auxiliary Image Capture Devices for Image Processing and Related Methods filed Dec. 9, 2011 as PCT/US11/64050(not yet published).

Chen, Shu-Ching et al., Video Scene Change Detection Method Using Unsupervised Segmentation and Object Tracking, IEEE International Conference on Multimedia and Expo (CME), pp. 57-60, 2001.

Noll, Tobias et al., Markerless Camera Pose Estimation—An Overview, Visualization of Large and Unstructured Data Sets—IRTG Workshop, pp. 45-54, 2010.

Chen, Shenchang Eric et al., View Interpolation for Image Synthesis, Proceedings of ACM SIGGRAPH, pp. 279-288, 1993.

McMillian, Jr., Leonard, An Image-Based Approach to Three-Dimensional Computer Graphics, PhD. Dissertation submitted to the University of North Carolina at Chapel Hill, Apr. 1997.

Chen, Shu-Ching et al., Video Scene Change Detection Method Using Unsupervised Segmentation and Object Tracking, IEEE International Conference on Multimedia and Expo (ICME), pp. 57-60, 2001.

International Search Report and Written Opinion mailed Aug. 27, 2013, for related PCT Application Serial PCT/US13/37010 and references cited therein.

\* cited by examiner

METHODS, SYSTEMS, AND COMPUTER PROGRAM PRODUCTS FOR CREATING THREE-DIMENSIONAL VIDEO SEQUENCES

CROSS REFERENCE TO RELATED APPLICATION

This application claims the benefit of U.S. provisional patent application Ser. No. 61/409,664, filed Nov. 3, 2010; the disclosure of which is incorporated herein by reference in its entirety.

TECHNICAL FIELD

The subject matter disclosed herein relates to generating a video sequence of a scene. In particular, the subject matter disclosed herein relates to methods, systems, and computer program products for using a two-dimensional video sequence of a scene to create a three-dimensional video sequence of the scene.

BACKGROUND

Stereoscopic, or three-dimensional, video is based on the principle of human vision. Video is a sequence of captured images (or frames), each of which, when combined with camera displacement, can record the same object(s) or new objects from slightly different angles. In such case, the captured sequence can then be transferred to a processor that may assign the captured sequence as the view for one eye (i.e., left or right eye), may analyze the individual frames and possibly interpolate additional frames/frame views, and may, for each frame generate a corresponding view for the other eye. The two resulting video sequences may then be combined to create a three-dimensional video sequence. The resulting three-dimensional video sequence can further be encoded using, but not limited, to one of the popular video encoding formats such as motion JPEG, MPEG, H.264, and the like. The video sequence can further be stored with audio to a digital media using a format such as, but not limited to, .avi, .mpg, and the like.

Many techniques of viewing stereoscopic video have been developed and include the use of colored or polarizing filters to separate the two views, temporal selection by successive transmission of video using a shutter arrangement, or physical separation of the two views in the viewer and projecting them separately to each eye of a viewer. In addition, display devices have recently been developed that are well-suited for displaying stereoscopic images and videos. For example, such display devices include, but are not limited to, digital still cameras, personal computers, digital picture frames, set-top boxes, high-definition televisions (HDTVs), and the like.

The use of digital image capture devices, such as, but not limited to, digital still cameras, digital camcorders (or video cameras), and phones with built-in cameras, for use in capturing digital images has become widespread and popular. Because video sequenced captured using these devices are stored in a digital format, such video can be easily distributed and edited. For example, the videos can be easily distributed over networks, such as the Internet. In addition, the videos can be edited by use of suitable software on the image capture device or a personal computer.

Video sequences captured using conventional single lens, single sensor image capture devices are inherently two-dimensional. While dual lens/sensor combinations can be used to create three-dimensional content, it is desirable to provide methods and systems for using these conventional devices for generating three-dimensional videos.

SUMMARY

Methods, systems, and computer program products for creating three-dimensional video sequences of a scene are disclosed herein. Particularly, embodiments of the presently disclosed subject matter can include a method that uses a processor and memory for receiving a two-dimensional video sequence of a scene. The two-dimensional video sequence can include multiple frames. The method may also include selecting a target frame, T, from among the multiple frames. Further, the method may include selecting a first subset of frames representative of a large camera displacement, N, from among the multiple frames that are associated with the target frame T. The method may also include analyzing the first subset of frames to identify two images for use in forming a stereoscopic pair of frames with a predetermined spatial difference. Further, the method may include extracting depth data of static objects in the stereoscopic pair of frames. The method may also include selecting a second subset of frames representative of a small camera displacement, n ($n \ll N$), from among the multiple frames that are associated with T. The method may include utilizing the second subset of frames to calculate depth of moving objects. The method may also include combining the static and moving objects based on the depth data. Further, the method may include generating a three-dimensional video frame corresponding to the target frame based on the depth data.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the present subject matter is not limited to the specific methods and instrumentalities disclosed. In the drawings.

DETAILED DESCRIPTION

Figure 1:
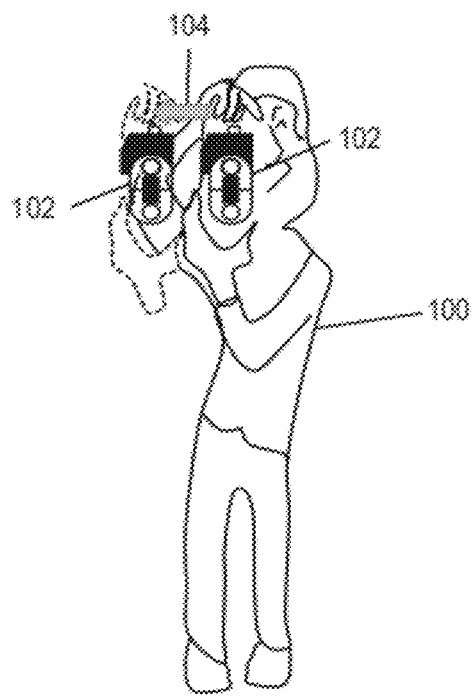
FIG. 1 is a front view of a user holding a camera and moving the camera for creating an initial panning sequence of a scene in accordance with embodiments of the present subject matter.

The subject matter of the present subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Methods, systems, and computer programs products for creating three-dimensional video sequences are disclosed. According to an aspect, a method includes receiving a two-dimensional video sequence of a scene. For example, a camera or other image capture device may capture the two-dimensional video sequence. The two-dimensional video sequence can include a plurality of frames. The method also includes selecting a target frame from among the plurality of frames. Further, the method includes selecting a subset of frames from among the plurality of frames that are associated with the target frame. The method also includes determining a depth of the scene based on the target frame and the subset of frames. Further, the method includes generating a three-dimensional video frame corresponding to the target frame and based on the determined depth.

Embodiments of the present subject matter relate to an image capture device, such as a camera, that allows a user to capture a two-dimensional video sequence or use a stored two-dimensional video sequence for generating a three-dimensional video sequence based on the two-dimensional video sequence. The functions disclosed herein can be implemented in hardware, software, and/or firmware that can be executed within the image capture device. Example image capture devices include, but are not limited to, a digital still camera, a video camera (or camcorder), a personal computer, a digital picture frame, a set-top box, an HDTV, a phone, and the like.

According to one or more other embodiments of the present subject matter, a method can include use of macro stereo base-techniques (i.e., utilizing two or more frames captured at a large horizontal displacement of the capture device in the original video sequence) to create a very accurate representation of the background and the non-moving objects on the scene. Further, the method can include the use of micro stereo base techniques (i.e., utilizing two or more frames captured at a small horizontal displacement of the capture device in the original video sequence) to create a very accurate representation of close as well as moving objects. Such three-dimensional video sequences can be viewed or displayed on a suitable stereoscopic display.

The functions and methods described herein can be implemented on an image capture device capable of capturing still images and executing computer executable instructions or computer readable program code on a processor. The image capture device may be, for example, a digital still camera, a video camera (or camcorder), a personal computer, a digital picture frame, a set-top box, an HDTV, a phone, or the like. The functions of the image capture device may include methods for selecting video segments, creating corresponding views for each image in the sequence, rectifying and registering at least two views, matching the color and edges of the views, performing stabilization of the sequence, altering the perceived depth of objects, and display-specific transformation to create a single, high-quality three-dimensional video sequence.

Image capture devices as disclosed herein may be utilized in various types of shooting modes for capturing a video sequence. In an example shooting mode, a video camera may remain static. For example, the video camera may be mounted on a tripod or otherwise kept stationary during image capture. A user may control the video camera to capture images of an event that is fully or partially contained within a fixed field of view of the video camera. The video camera may pan left, right, or another suitable direction for capturing panoramic scenery of the event.

In another example shooting mode, a user may hold the camera during use of the camera to capture images of an event. The event may be fully or partially contained within a fixed field of view of the camera. In contrast with the aforementioned example of using a tripod or otherwise keeping the camera stationary, the camera may not be kept perfectly static in this example, because it can be difficult for someone holding the camera to keep it still. In this case, there may be some vertical and/or horizontal movement even if anti-shaking techniques are implemented on the camera.

In yet another example shooting mode, a user may pan the camera or move in various directions to either follow an object that is moving from the camera's field of view, or to refocus on a different object within the same field of view. The panning movement may be a parallel and/or rotating movement of the camera.

According to an embodiment, a method may include utilizing macro stereo base techniques to estimate depth when there is a significant movement of the camera. The results from the micro stereo base techniques may be further used in conjunction with the macro stereo base results to estimate the depth of a scene when the movement of the camera is very small.

In an embodiment, a first step in creation of a stereoscopic sequence is to define an initial three-dimensional representation of a scene or environment. Once a three-dimensional static space has been defined, moving objects may be identified. A depth of the moving objects can be estimated. Further, the objects may subsequently be placed a suitable depth in the previously constructed scene. The moving objects may be tracked while they are moving into the scene, and the location of the objects may be adjusted accordingly. Other objects may enter the field of view, or other static objects may appear on the scene as a result of camera panning. These other objects may also be detected and incorporated at a suitable depth into the scene.

FIG. 1 illustrates a front view of a user 100 holding a camera 102 and moving the camera 102 for creating an initial panning sequence of a scene (not shown) in accordance with embodiments of the present subject matter. A method of creating a three-dimensional video sequence of the scene may include creating a panning sequence of the scene by having a user move the camera in any direction (e.g., generally to the right or left). In this example, the user 100 is moving the camera 102 to his right as indicated by the direction arrow 104. Alternatively, the user 100 may move the camera 102 to his left or any other suitable direction. As the camera 102 is moved, the camera 102 may capture a two-dimensional video sequence of the scene. The two-dimensional video sequence may include multiple frames of images. After the initial panning sequence has been completed, the user 100 can keep the camera 102 on the same field of view to continue capturing a moving object that remains in the same place (i.e., a person talking), or the user 100 can move the camera 102 to re-center to either a different object, or to a new object entering or leaving the field of view. The captured video sequence, which can be a combination of the previously described shooting techniques, may be used for creating a three-dimensional video sequence in accordance with embodiments described herein.

Figure 2:
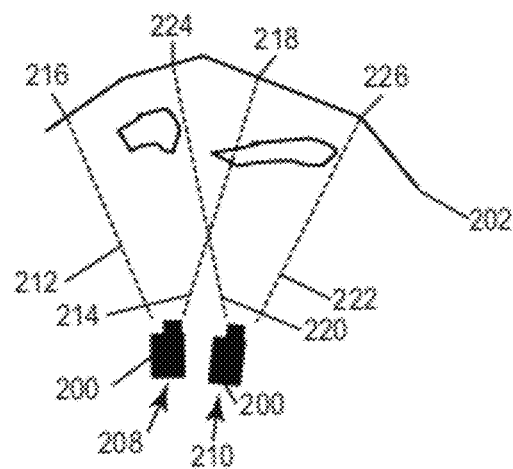
FIG. 2 is a diagram depicting a top view of an example panning sequence that may be implemented by use of an image capture device in accordance with embodiments of the present subject matter.

FIG. 2 illustrates a diagram depicting a top view of an example panning sequence that may be implemented by use of an image capture device 200 in accordance with embodiments of the present subject matter. Referring to FIG. 2, the image capture device 200 is a camera positioned for capturing images of a background 202 of a scene. Objects 204 and 206 are positioned in a foreground area of the scene. In these positions, images of the objects 204 and 206 are also captured by the device 200. In this example, the device 200 is moved or panned between a position generally referenced as 208, where the device 200 is depicted by solid lines, and a position generally referenced as 210, where the device 200 is depicted by broken lines. During panning between positions 208 and 210, the device 200 captures and stores a two-dimensional video sequence of the scene. When the device 200 is located at position 208, the device 200 captures one or more images of a field of view defined by lines 212 and 214, which contains segments 216 through 218 of the background 202 of the scene, as well as images of the object 204 and part of the object 206. When the device 200 is located at position 210, the device 200 captures one or more images of a field of view defined by lines 220 and 222, which contains segments 224 through 226 of the background 202 of the scene, as well an image of the object 206.

Figure 3:
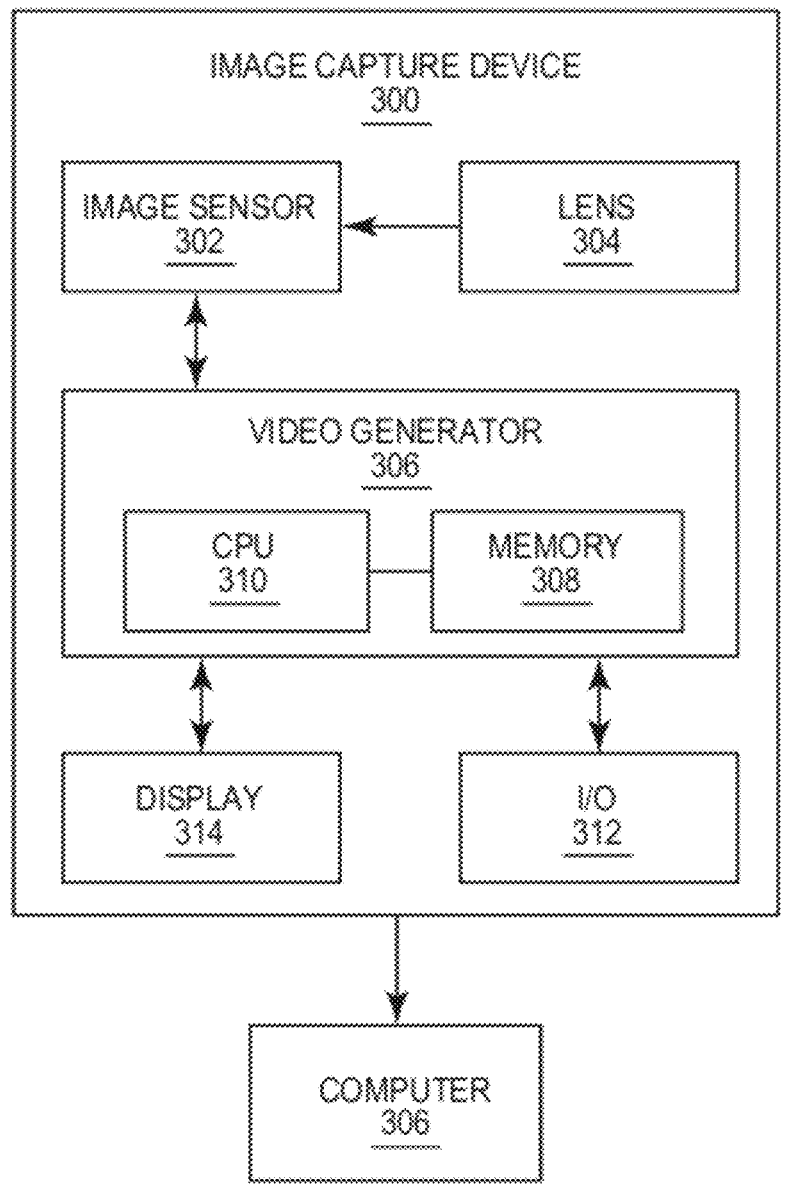
FIG. 3 is a block diagram of an example image capture device including an image sensor and a lens for use in capturing a two-dimensional video sequence of a scene according to embodiments of the presently disclosed subject matter.

Method embodiments described herein can be implemented on an image capture device capable of capturing still images and video sequences. The image capture device may also be capable of displaying three-dimensional images or videos, and executing computer readable program code on a processor. Such computer readable program code may be stored on a suitable computer readable storage medium. The image capture device may be, for example, a digital still camera, a video camera (or camcorder), a personal computer, a digital picture frame, a set-top box, an HDTV, a phone, or the like. As an example, FIG. 3 illustrates a block diagram of an example image capture device 300 including an image sensor 302 and a lens 304 for use in capturing a two-dimensional video sequence of a scene according to embodiments of the presently disclosed subject matter. Further, the image capture device 300 may include a video generator 306 configured to create three-dimensional video sequences in accordance with embodiments of the presently disclosed subject matter. In this example, the image capture device 302 is capable of capturing a digital camera digital video of a scene. The image sensor 302 and lens 304 may operate to capture multiple consecutive still digital images of the scene. In another example, the image capture device 300 may be a video camera capable of capturing a video sequence including multiple still images of a scene. A user of the image capture device 300 may position the system in different positions for capturing images of different perspective views of a scene. The captured images may be suitably stored and processed for creating a three-dimensional video sequence of the scene as described herein. For example, subsequent to capturing the images of the different perspective views of the scene, the image capture device 300, alone or in combination with a computer such as computer 306, may use the images for creating a three-dimensional video sequence of the scene and for displaying the three-dimensional video sequence to the user.

Referring to FIG. 3, the image sensor 302 may include an array of charge coupled device (CCD) or CMOS sensors. The image sensor 302 may be exposed to a scene through the lens 304 and a respective exposure control mechanism. The video generator 306 may include analog and digital circuitry such as, but not limited to, a memory 308 for storing computer readable program code including computer readable code that controls the image capture device 300, together with at least one CPU 310, in accordance with embodiments of the presently disclosed subject matter. The CPU 310 executes the computer readable code so as to cause the image capture device 300 to expose the image sensor 302 to a scene and derive digital images corresponding to the scene. The digital images may be captured and stored in the memory 308. All or a portion of the memory 308 may be removable, so as to facilitate transfer of the digital images to other devices such as the computer 306. Further, the image capture device 300 may be provided with an input/output (I/O) interface 312 so as to facilitate transfer of digital image even if the memory 308 is not removable. The image capture device 300 may also include a display 314 controllable by the CPU 310 and operable to display the captured images in real-time for real-time viewing by a user. The display 314 may also be controlled for displaying the three-dimensional video sequences created in accordance with embodiments of the present subject matter.

Figure 4A:
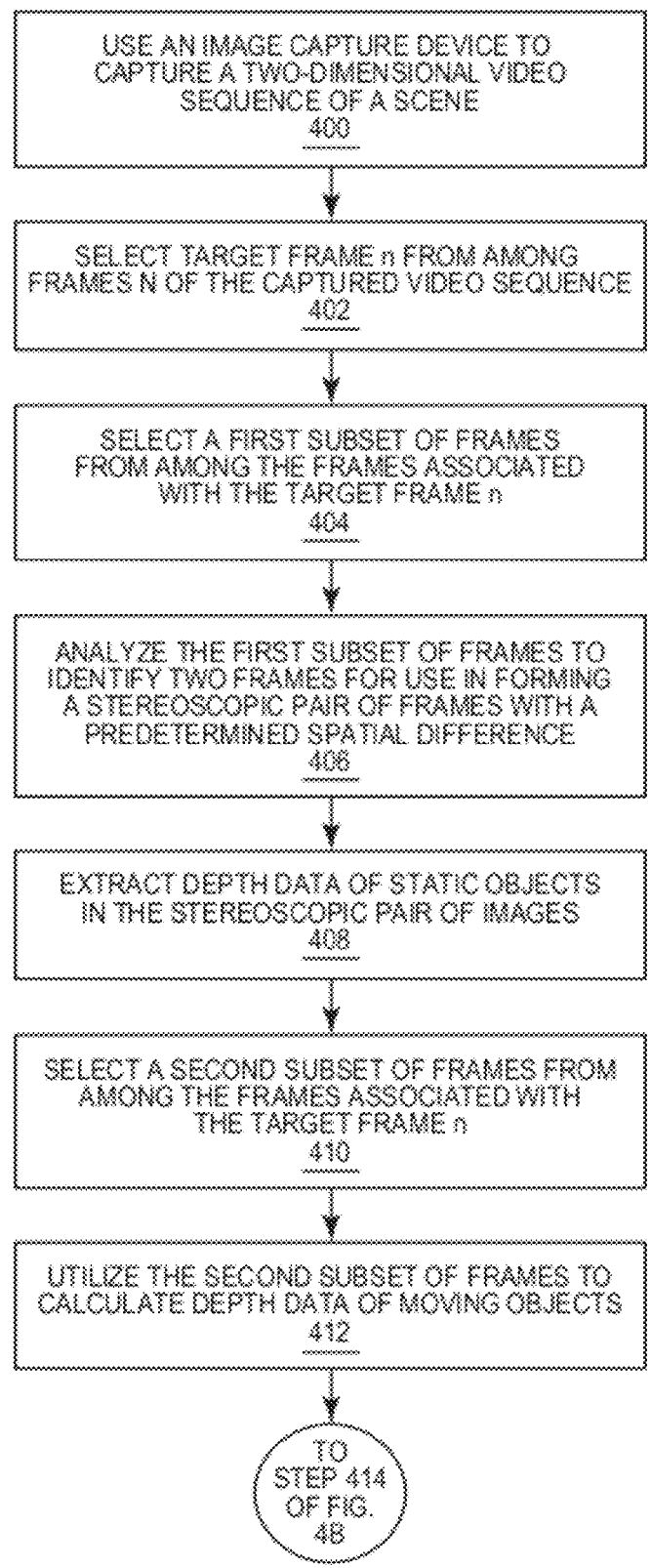
FIGS. 4A and 4B depict a flow chart of an example method for creating a three-dimensional video sequence of a scene using the image capture device, alone or together with any other suitable device, in accordance with embodiments of the present disclosure.
Figure 4B:
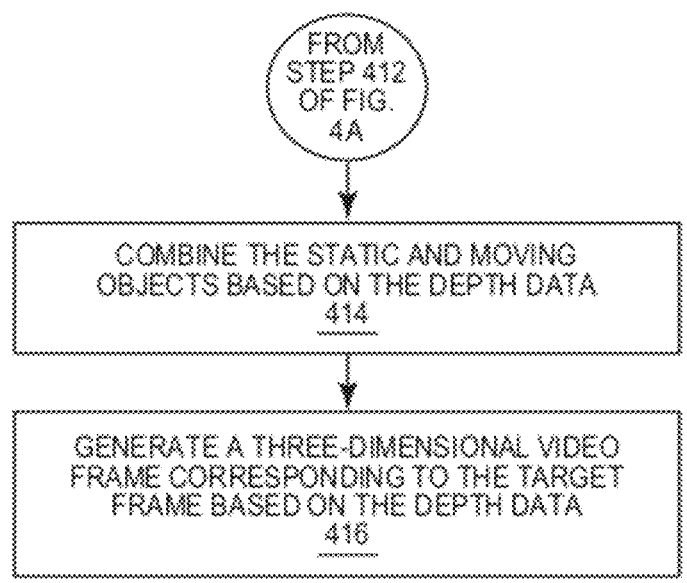

The memory 308 and the CPU 310 may be operable together to implement the video generator 306 for performing image processing including generation of three-dimensional images in accordance with embodiments of the presently disclosed subject matter. The video generator 306 may control the image sensor 302 and the lens 304 for capturing a two-dimensional video sequence of a scene. The video sequence may include multiple frames. Further, the video generator 306 may further process the images and generate a three-dimensional video sequence of the scene as described herein. FIGS. 4A and 4B illustrate a flow chart of an example method for creating a three-dimensional video sequence of a scene using the image capture device 300, alone or together with any other suitable device, in accordance with embodiments of the present disclosure. Referring to FIGS. 4A and 4B, the method includes using 400 an image capture device to capture a two-dimensional video sequence of a scene. For example, the video generator 306 shown in FIG. 3 may control the image sensor 302 and the lens 304 to capture a two-dimensional video sequence of a scene. The captured video sequence may include images of the same or different perspective views of the scene. The CPU 310 may then implement computer readable code stored in the memory 308 for receiving and storing the captured video sequence in the memory 308.

The method of FIGS. 4A and 4B includes selecting 402 a target frame from among frames of the captured video sequence. For example, the video generator 306 may select a target frame T from among multiple frames captured by the image sensor 302 and the lens 304. The method of FIGS. 4A and 4B includes selecting 404 a first subset of frames, N, from among the plurality of frames that are associated with the target frame TN represents a desired macro stereo base offset of camera position from the position related to the target frame T, as measured by camera pose information gathered from the sequence or by camera positional sensor data. The method of FIGS. 4A and 4B includes analyzing 406 the first subset of frames to identify two images or frames for use in forming a stereoscopic pair of frames representative of the desired macro stereo baseline (predetermined spatial displacement of the capture device). For example, the video generator 306 may analyze the first subset of frames for identifying the two images or frames. The predetermined spatial difference may be such that the two images provide an optimal viewing of the scene.

The method of FIGS. 4A and 4B includes extracting 408 depth data of static objects via measurement of their pixel disparities in the stereoscopic pair of frames. For example, the video generator 306 may extract depth data of static objects in the stereoscopic pair of frames.

The method of FIGS. 4A and 4B includes selecting 410 a second subset of frames, n, from among the plurality of frames, N, that are representative of a substantially smaller stereo baseline separation of camera positions than is N. For example, the video generator 306 may select a second subset of frames from among multiple captured frames that are associated with the sequence of frames, N.

The method of FIGS. 4A and 4B includes utilizing 412 the second subset of frames, n, to measure small disparities of and construct depth data for moving objects. For example, the video generator 306 may utilize the second subset of frames to calculate depth data of moving objects.

The method of FIGS. 4A and 4B includes combining 414 the static and moving objects based on the depth data. For each image, image warping techniques may be used, along with the two-dimensional capture data, to generate a suitable second view for a stereo pair. For example, the video generator 306 may combine the static and moving objects based on the depth data.

The method of FIGS. 4A and 4B includes generating 416 a three-dimensional video frame corresponding to the target frame based on the depth data. For example, the video generator 306 may generate a three-dimensional video frame corresponding to the target frame based on the depth data.

In an example, the method of FIGS. 4A and 4B may include one or more steps of identifying suitable frames, registration, stabilization, color correction, transformation, and depth adjustment. Further, the method may include generating one or more additional frames and frame viewpoints using one of existing raster data and depth information. Further, the method may include using a micro or macro stereo based technique for generating image representations of close and moving objects of the scene. A display, such as the display 314 or a display of the computer 306, may display multiple three-dimensional video frames in a sequence.

Figure 5A:
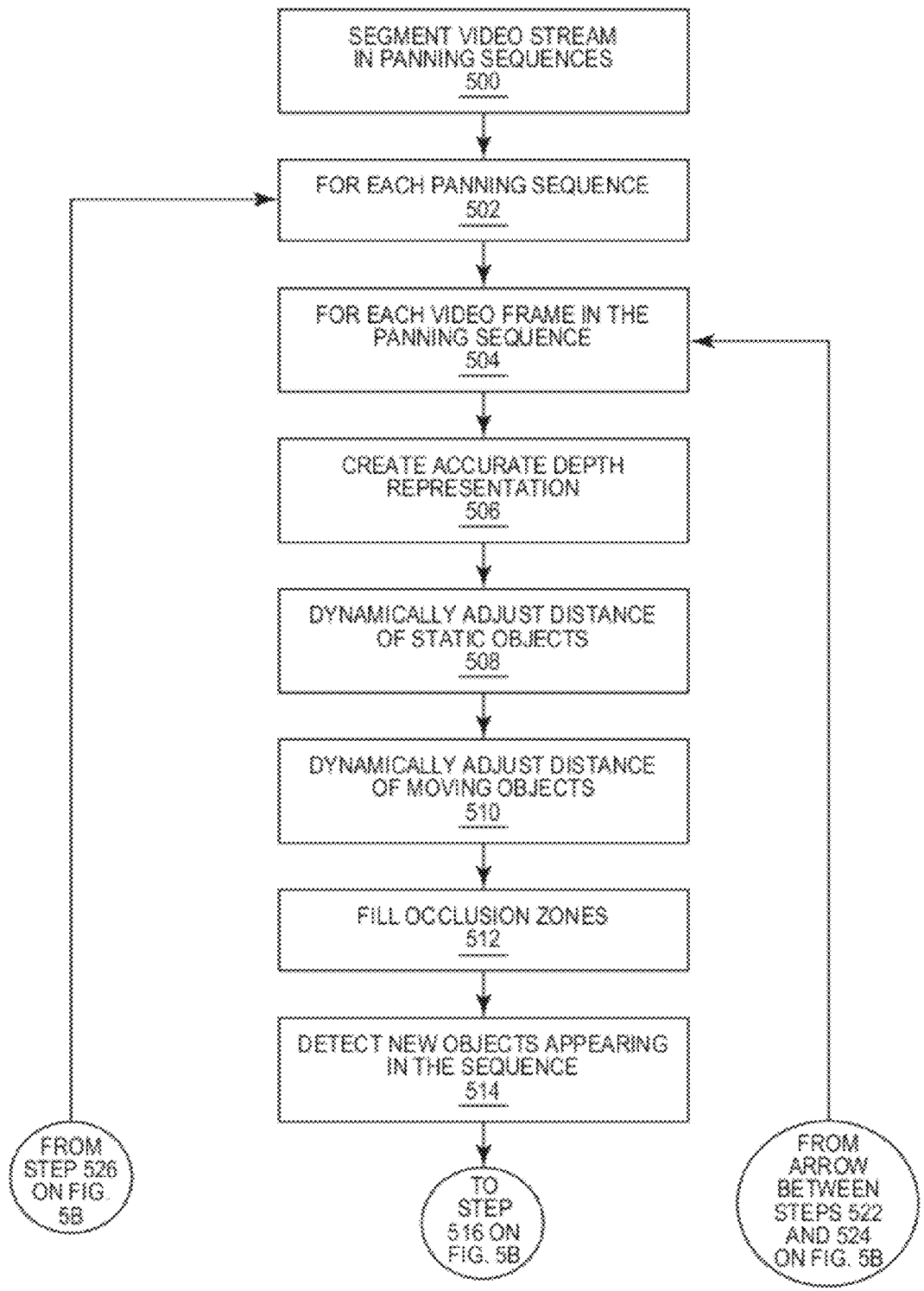
FIGS. 5A and 5B depict a flow chart of an example method for creating a three-dimensional video sequence of a scene in accordance with embodiments of the present subject matter.
Figure 5B:
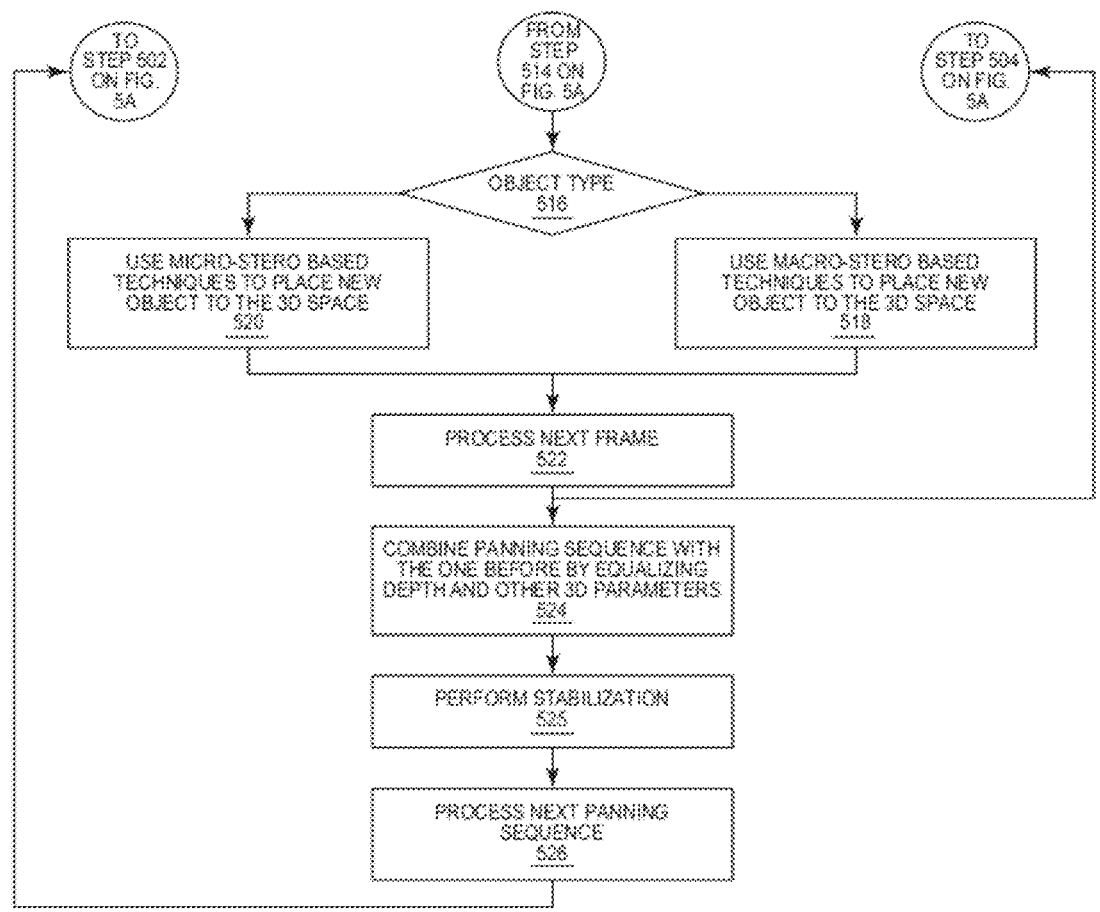

FIGS. 5A and 5B illustrate a flow chart of an example method for creating a three-dimensional video sequence of a scene in accordance with embodiments of the present subject matter. The example method of FIGS. 5A and 5B may be implemented by any suitable image capture device, such as the image capture device 300 shown in FIG. 3. For example, the video generator 306 shown in FIG. 3 may control components of the image capture device 300 to implement the steps of the method of FIGS. 5A and 5B. Referring to FIG. 5, the method includes segmenting 500 a video stream into panning sequences based on camera motion. In an example, such segmenting may include identifying instances in which a camera pans horizontally or vertically, instances in which the camera is still, combinations of these, and the like. Each instance of horizontal panning (alone or in part with other camera motion) may represent an instance of a macro stereo base, while still instances and instances dominated by only vertical motion may utilize micro stereo base. Sequences can be divided by utilizing a combination of a scene change detection technique and camera pose information. Camera pose can be generated using any combination of any suitable on-board motion sensor data and suitable computer vision techniques that utilize camera calibrations matrices.

Subsequent to step 500, processing for each panning sequence is implemented as shown in FIGS. 5A and 5B. The processing of each panning sequence begins at step 502. For each target frame, T, a subset of frames, N, representing a desired horizontal displacement of the capture device, herein referred to as the macro stereo base can be identified. In the event that a given panning sequence does not displace the camera enough to reach the targeted stereo baseline, a lesser value may be used, provided it is representative of a macro stereo base, typically representing a distance at least as wide as typical human eye separation (6-7 cm), and preferably longer. Measurement of this displacement can be performed using either analysis of camera pose or using positional sensor data from the camera. Further, following step 502, processing for each video frame in the panning sequence is implemented in a process which begins at step 504. Once such panning sequence information is gathered, the resulting video segment can be used to create an accurate depth representation of the scene (step 506). The accuracy of these measurements may be further enhanced via interpolation (upsampling) of intermediate frame data, if needed. The captured video sequence can be partitioned in panning sequences that are processed separately (e.g., beginning at step 502). A new panning sequence can be defined when there is a significant or predetermined change on the rate at which the video sequence is captured (e.g., camera is panning, remaining static, accelerating/decelerating in one direction, and the like) and/or a significant change in the contents of the scene (e.g., objects passing into or out of view). In each panning sequence, the individual frames can be processed to determine the depth of the objects. For each frame, object segmentation can be performed to identify static and moving objects.

Figure 6:
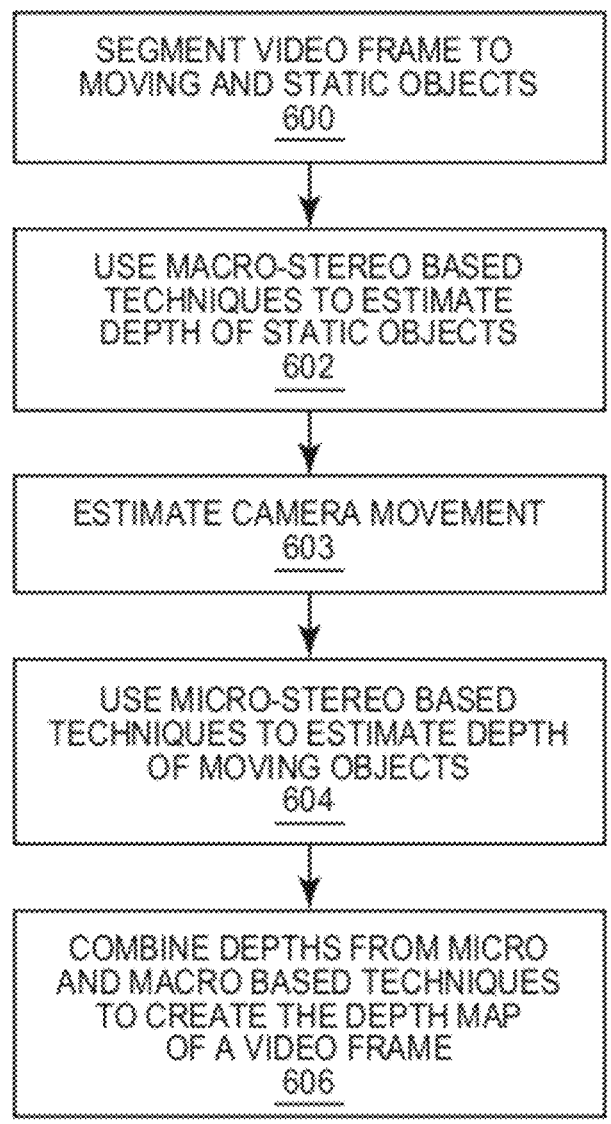
FIG. 6 is an example method for depth creation according to an embodiment of the present subject matter.

Extraction of the depth information can be a two-step process. During the first step, macro stereo base techniques can be used to identify depth of static objects. During the second step, micro stereo base techniques can be used to identify the depth of moving objects. FIG. 6 illustrates an example method for depth creation according to an embodiment of the present subject matter. Referring now to FIG. 6, the method includes segmenting video frames to moving and static objects (step 600). At step 602, the method includes using macro-stereo base techniques to estimate a depth of the static objects. At step 603, the method may include estimating the camera movement. At step 604, the method includes using micro stereo base techniques to estimate depth of moving objects. Next, at step 606, the method includes combining the estimated depths from the micro- and macro-stereo base techniques to create a depth map of a video frame.

Figure 7:
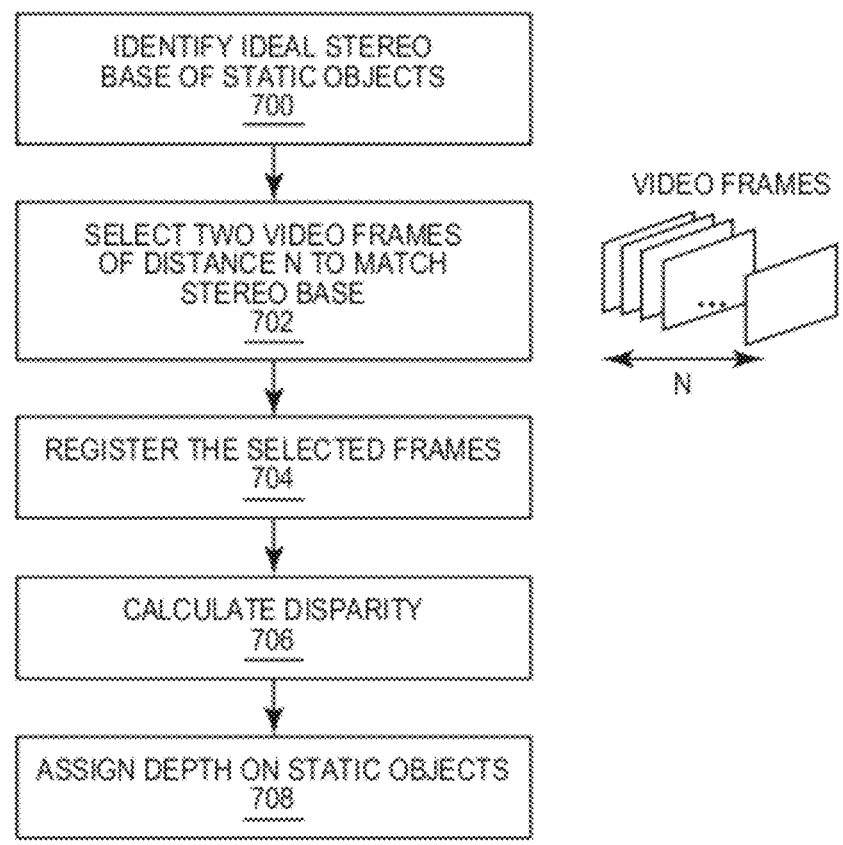
FIG. 7 is a flow chart of an exemplary method for depth creation using a macro-stereo based technique according to an embodiment of the present subject matter.

Referring now to FIG. 7, which illustrates a macro stereo base technique in accordance with embodiments of the present subject matter, the method includes identifying ideal stereo based of static objects (step 700), which selects the subset of frames, N, from the current panning sequence of frames (step 702). Further, the method includes registering the selected frames (step 704) and calculating disparity (step 706). The method also includes assigning depth on static objects (step 708).

The initial panning sequence may include of collection of frames that are taking at different locations. Each symmetric pair of such collection can create a stereoscopic representation of static objects or subjects on the scene at different depths.

Objects that are relatively far from the capture device may require a larger stereo base (defined herein as a macro stereo base) to accurately estimate depth of the objects. Referring to FIG. 2 for example, and during the capture of a video sequence, N frames may have been captured between positions 208 and 210 of the image capture device 200. Each pair of those frames around the center of the 208 and 210 positions can form a stereoscopic pair of different stereo base and therefore a different depth perception. For accurate representation of the depth, it may be more ideal that image capture device positions between positions 208 and 210 moves laterally without toeing out. Based on the example of FIG. 2, a pair of those frames may be used to create an initial three-dimensional representation of the space outlined by lines 214 and 220 that includes the segment between 218 and 224, the object 204, and a small portion of object 206. By continuing this example method, other areas can be covered to generate a stereoscopic view of the area of interest. For example, FIG. 7 illustrates a flow chart of an exemplary method for depth creation using a macro-stereo based technique according to an embodiment of the present subject matter. For such a macro stereo base, measurement of the depth of individual objects may be accomplished by analyzing image pairs at an interval N, such that the interval is representative of a target stereo baseline, or by maintaining depth values of those same objects in the case that the capture device is no longer being displaced (between panning sequences). Image pairs are registered and processed by use of suitable techniques. The displacement, or disparity, of objects in the image pairs may then be measured and translated into depth under the general stereo equation $$h = \frac{\text{Baseline} * \text{FocalLength}}{\text{disparity}},$$

where Baseline is the distance of camera movement in the interval of N frames and FocalLength is the focal length of the camera lens. This macro-stereo base technique may allow identification of disparities of, and assign depth to, static objects in the scene. In an embodiment, a dense disparity map may be generated, producing a disparity result (and hence, a depth estimate) for each pixel in the frame. In another embodiment, in part because the calculation of a dense disparity map may be difficult, techniques using feature detection and tracking can be used to generate only a sparse disparity map for a subset of pixels. Additionally, moving objects may be identified and ignored during this process.

Returning to FIGS. 5A and 5B, the method may include a small stereo baseline (micro-stereo) analysis to calculate depth of moving objects and near objects for which disparity techniques are weak at larger stereo baselines (e.g., step 504). Prior to micro-stereo analysis, the movement of the camera may be computed to increase the accuracy of the micro-stereo analysis since it relies on small camera movements (step 603 of FIG. 6).

For each frame in the sequence, camera movement can be recorded via a suitable module such as, but not limited to, a gyroscopic sensor residing in the camera. Another method of identifying the positioning of the camera includes analyzing two frames, identifying key points in both frames, rectifying and extracting the fundamental matrix relationship, and combining with camera parameters (focal length and the like) to generate the projective camera matrices for each position.

Analysis of the motion vectors of each pixel within the context of object segmentation can provide detailed information of the depth of a scene. Analysis of motion vectors of static objects, due to camera movement, can detect the movement of an image capture device. If an object is at the same depth, motion vectors of that object can accurately detect the lateral (horizontal and/or vertical movement of the camera). If parts of an object reside in various depths, the motion vectors of the individual pixels can accurately detect the rotational movement of the image capture device.

Figure 8:
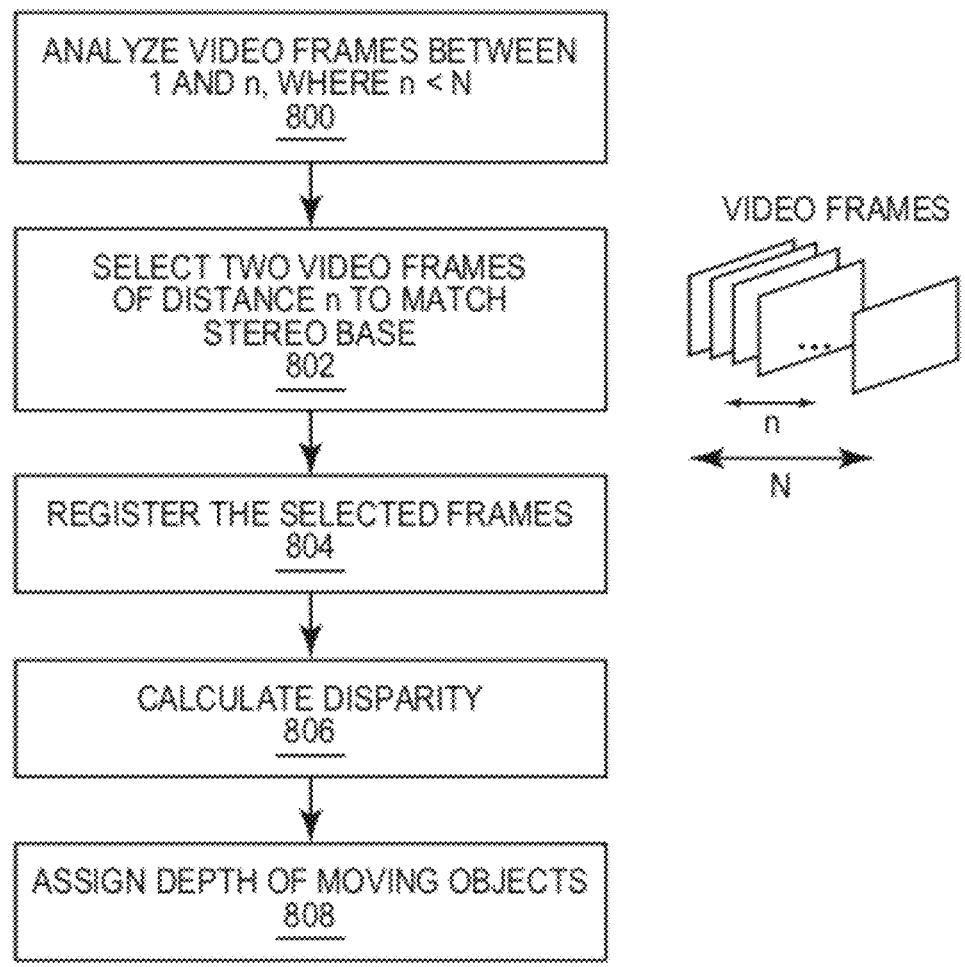
FIG. 8 is a flow chart of an example method for depth creation using a micro-stereo based technique according to an embodiment of the present subject matter.

In an example, FIG. 8 illustrates a flow chart of an example method for depth creation using a micro-stereo based technique according to an embodiment of the present subject matter. This may be accomplished by analyzing image pairs at an interval M, such that M<<N. The value of n may be the equivalent of the motion incurred in panning for $\frac{1}{60}$ to $\frac{1}{15}$ of a second. Each pair of images may again be registered and processed with suitable techniques. Disparities of objects in the scene that may have been previously recognized as moving or non-static can be measured using the same general techniques and again, depths can be assigned. Since the camera movement during the interval of n frames may be relatively small, this represents a micro-stereo based approach that allows evaluation of object depth for non-static objects with a high degree of confidence, such as may not be possible by use of a macro-stereo technique, due to temporal latency. By also compensating for camera movement as described at step 303 of FIG. 6 can further improve the quality of micro-stereo analysis.

Referring now to FIG. 8, the method includes analyzing video frames between 1 and n, where n is less than N (step 800). The method also includes selecting two video frames of distance n to match stereo base (step 802). Further, the method includes registering the selected frames (step 804). The method also includes calculating disparity (step 806) and assigning depth of close objects and objects identified as moving (step 808).

Figure 9:
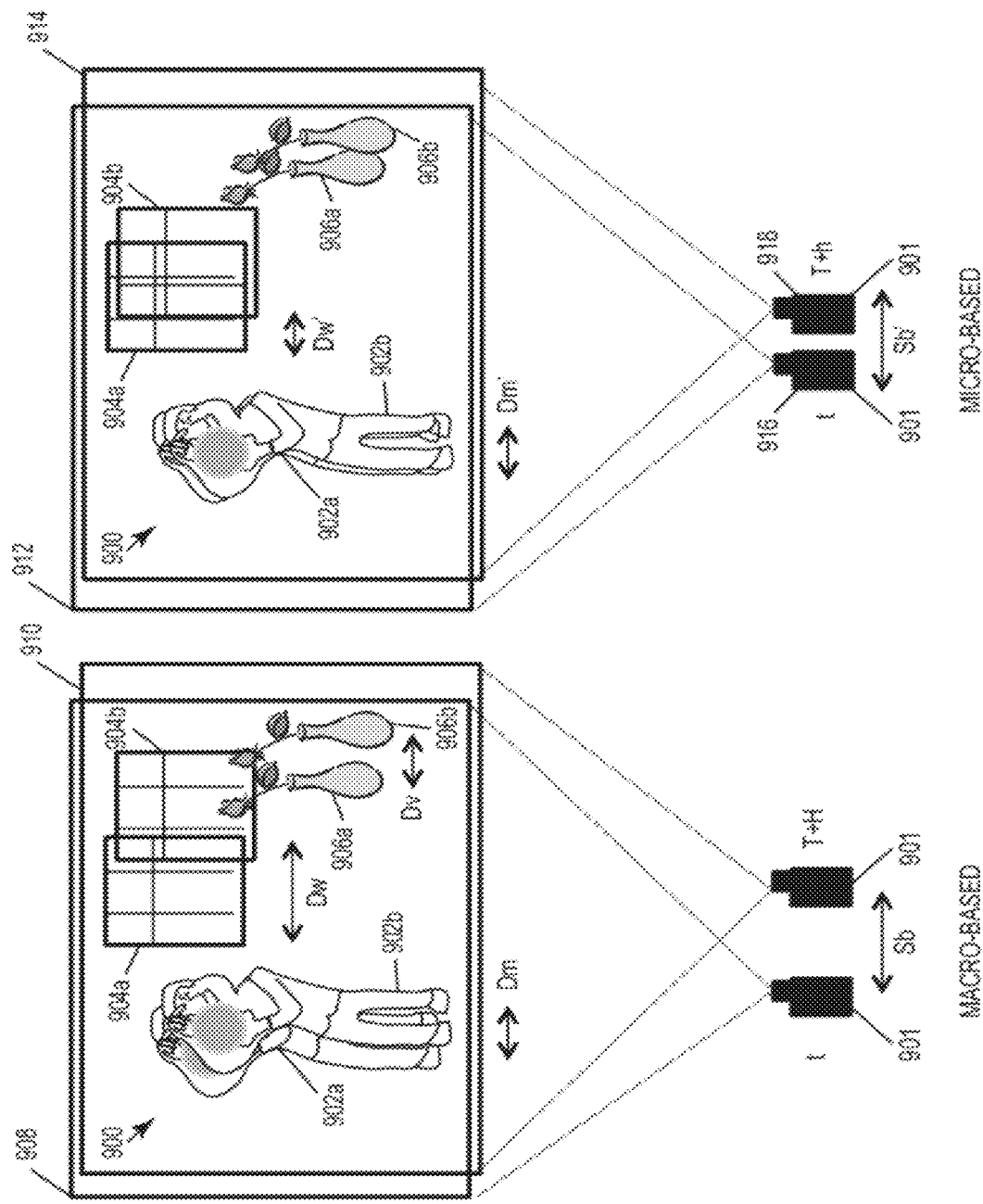
FIG. 9 is a diagram showing depth calculation using a micro-based technique in accordance with an embodiment of the present subject matter.

FIG. 9 illustrates a diagram showing depth calculation using a micro-based technique in accordance with an embodiment of the present subject matter. Referring to FIG. 9, a scene including a background area generally designated 900, a moving object 902 (person), a static object 904 (window), and another static object 906 (base) is captured using a camera. During the initial panning sequence, two frames taken at times t and t+H (indicated by frame 908 and 910, respectively) have been used to construct the macro stereo base depth representation of the scene. The objects captured in the first frame 908 are designated by "a" (e.g., objects 902a, 904a, and 906a), and the object captured in the second frame 910 are designated by "b" (e.g., objects 902b, 904b, and 906b). The disparity between the moving object 902a, 902b in the frames 908 and 910 is indicated by Dm, the disparity between the static object 904a, 904b in the frames 908 and 910, which is further in the back in the background 900 is indicated by Dw, and the disparity between the static object 904a, 904b is indicated by Dv. In this particular example, Dm<Dv<Dw.

During a panning sequence, if the object 902a, 902b is moving, a smaller stereo base technique can be used for the depth analysis. Under the micro stereo basis analysis shown on the right side of FIG. 9, two frames 912 and 914 that are close in time are examined (t and t+h, where h is much smaller than H). In such case, the movement of the object 902a, 902b is very small and conceptually static. In an example, motion estimation techniques may be used to compensate for the motion of the moving object. By disabling any motion stabilization capabilities inside the camera, there can be some natural micro-stereo based because of handshaking and this can result in movement of the camera from positions 916 to 918 of the camera 901. The process may be repeated multiple times with different values of n (where n<h) until a disparity value for each object identified as moving is available that discounts most or all of the motion of the object. It is noted that the disparity values may only be important in relative relation to the image, and need not represent specifically accurate disparity for each object.

Now referring back to FIGS. 5A and 5B at step 506, at the point of having data from step 508 in FIGS. 5A and 5B and step 808 in FIG. 8, macro and micro stereo base information can be combined. Disparity information from the macro stereo base calculations is assigned to the objects identified as "non-moving" or distant, relative to a given camera separation represented by a set of frames, N. Disparity information must then be added for moving and close objects using the result from the micro analysis. For close objects, this may be performed simply by noting the disparity result(s) from step 808 and the ratio between the specific value of n used to assign the value and N. The disparity for these pixels can become the value from step 808 multiplied by the factor N/n.

In FIG. 9, a Dm' disparity of the object 902a, 902b can be compared with the Dw' disparity of the known static object 904a, 904b and the Dw disparity of the static object in the macro stereo base case.

For moving objects, the relative relationships of the same pixels in the different analyses may be relied upon. From the micro calculation (e.g., step 808), a value of n can be identified for which a disparity can be assigned to the pixels in question. This disparity can have a relation to other pixels in the scene, and specifically, to pixels identified and placed in a previous video segment, or to pixels identified and placed at a particular static disparity in step 708. For pixels that correspond to those placed in an earlier segment, the depth assigned in that segment can be extrapolated to the current segment, while recognizing a possibility of approach toward or retreat from the camera.

For pixels not previously assigned, the ratios of the depth and displarity of known objects can be used to place unknown object. Without loss of generality, a pixel classified as moving at coordinate (j, k) in the micro analysis can be assumed to have an assigned disparity $d_1$ for the selected frame M, and a pixel at coordinate (m, n) that has a static disparity $D_2$ for separation N in the macro analysis and a value of $d_2$ for the selected frame n in the micro analysis. The disparity assigned this pixel in the final combined map can subsequently be calculated as $D_1 = D_2 * d_1/d_2$. Repetition of this process for multiple small intervals of n across a video segment can also be used to place approaching and retreating objects in a scene.

In one case, a suitable n may not be found, and other micro-based methods can be employed to calculate the depth of moving objects or movement of the camera. Utilization of those techniques may apply to values of n ranging from one to two. In other words, successive frames may be used to measure movement of various subjects.

At any given time, each of the above shooting modes can create movement of subjects that can be classified as of one of the following categories: absolute movement of objects on the scene; and movement of an image capture device that results into a movement of static objects on the scene (global motion for all static pixels on the scene) and a relative motion for the moving objects on the scene (global minus absolute motion). In the category of absolute movements of objects on the scene, this can be a three dimensional movement where objects travel in x, y, and z (i.e., depth) dimensions. In the category of movement of an image capture device, the movement of the camera can be three dimensional. Further, in this category, besides movement on the horizontal and vertical coordinates, movement on the depth (i.e., z-plane) can be caused by the actual camera moving closer or further away from the object or by utilizing the zoom capability of the image capture device. Further, movement of the image capture device can be either lateral or rotational.

Because the movement of an image capture device can be rotational, global motion many not be identical for all the static pixels on the scene. Pixels closer to the image capture device may have larger motion vectors and pixels far away from the image capture device may have smaller magnitude motion vectors compared to the closer objects. In addition, the movement of the image capture device cannot be constant and is expected that it can change over time. Therefore, at any given time each pixel (P) located in 'i' horizontal, a T vertical, and a 'k' depth coordinates can potentially have a different static motion vector caused by image capture device movement mvsx (t, i, j, k), mvsy (t, i, j, k) and mvsz (t, i, j, k) for horizontal, vertical, and z-plane movement, as well as absolute motion vector caused by the movement of the object (mvmx (t, i, j, k), mvmy (t, i, j, k) and mvmz (t, i, j, k) for horizontal, vertical, and depth movements). Knowing the location of any static pixel (Ps) in a frame (t), it location in time (t+1) can be found using the following equation:

$$Ps(t+1,i,j,k)=Ps(t,i+mvsx(t,i,j,k),j+mvsy(t,i,j,k),k+mvsz(t,i,j,k)+mvmz(t,i,j,k)) \quad \text{(Equation 1)}$$

Any moving pixel (Pm) in a frame (t+1) can be found in frame (t) using the following equation:

$$Pm(t+1,i,j,k)=Pm(t,i+mvsx(t,i,j,k)+mvmx(t,i,j,k),j+mvsy(t,i,j,k)+mvmy(t,i,j,k),k+mvsz(t,i,j,k)+mvmz(t,i,j,k)) \quad \text{(Equation 2)}$$

The static motion vectors (mvsx, mvsy, mvxz) can be calculated by analyzing the captured frames, identifying highly correlated static points on the images (Ps rectifying and registering the frames, and then calculating the inverse registration transform that can result from the movement of those points into the three dimensional space (Equation 1).

Once the static motion vectors have been calculated, the absolute motion vectors (mvmx, mvmy, mvmz) can be calculated by performing the same operation for the Pm points using Equation (2).

By subsequently subtracting the static motion vectors from the combined motion vectors, the absolute motion vectors for moving objects in the scene can be obtained. With the present analysis, the camera movement, the static background, and the moving objects can be fully defined into the three-dimensional space.

Non-flying objects can have an anchor point which is the ground for most part of static object staying at the ground. The initial position of such objects is based on their anchor points to the ground. The ground, or in general any static object, can be placed on the three-dimensional space by using the following technique:

First, the image can be analyzed to detect all static objects by looking at the disparity between two images comprising a stereo pair during macro stereo-base analysis;

The image can be segmented into static objects in objects;

In each object, key features can be identified that are also key features on a corresponding stereo pair during macro analysis; and The disparity of the key points provides a surface on the three dimensional space which is the static object.

For flying objects as well as non-flying in certain instances, their trajectory path can be identified and determine their path across other objects. If their path hides static objects, it can be implied that they are in front of them. If their path places them behind objects, their path is behind objects.

In case there is no much movement on the camera (both laterally and rotationally), the background can remain constant, and its depth has already been estimated. For moving objects and once an initial estimate is obtained, utilize motion compensation techniques can be used to estimate the speed of the object in the horizontal and vertical dimensions, and the rate of scaling methods to estimate its speed on the z-plane. Based on those estimates, the proper depth representation can be created.

Returning to FIGS. 5A and 5B, the method further includes the dynamic adjustment of the background or static objects when user pans the camera left or right to maintain the high depth accuracy obtained using the large stereo base (step 508). This adjustment may be performed by looking at the depth map gradient of the different surfaces that comprise the background scene and interpolating based on the amount of movement.

The method of FIGS. 5A and 5B further includes the dynamic adjustment of moving objects (step 510). For example, the size of moving objects may be compared with the size on the previous frames and if the size gets larger it is appropriately adjusted on the depth map by taking in consideration the size of the increase and the time frame at which this increase took place. Similarly, if the object size gets smaller, it can be moved back on the depth plane with the amount that is appropriate based on the size of the decrease and the tie for this decrease took place.

Once the lateral and rotational motion vectors of the camera have been estimated, the absolute motion vectors of the moving objects can also be estimated. The rate of increase of the size of a moving object determines its motion towards the camera (closer in depth) and the rate of decrease of the size determines the motion away from the camera (farther in depth).

Figure 10:
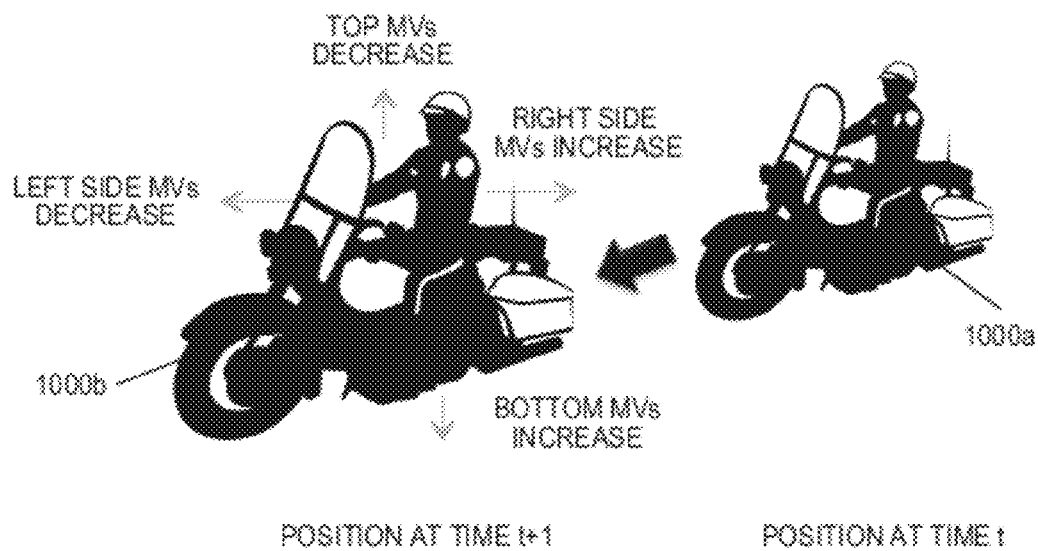
FIG. 10 illustrates diagrams of a micro stereo based technique using frame-by-frame analysis in accordance with an embodiment of the present subject matter.
Figure 10:
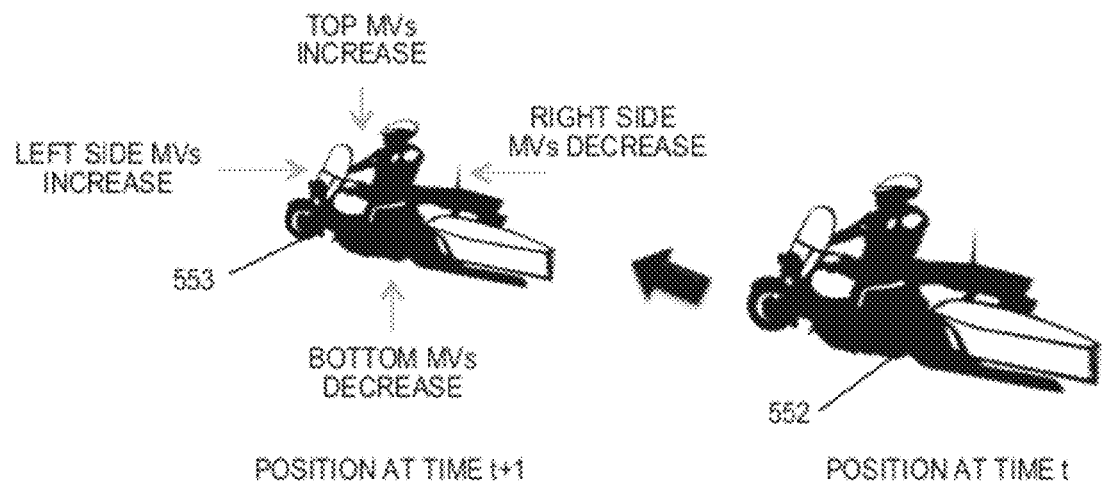

According to an embodiment, rate of scaling is a technique where key features of an object are measured between successive frames. Upon approach or retreat of an object from the camera (or camera from the object), object motion vectors may be indicative of the movement. FIG. 10 illustrates diagrams of a micro stereo based technique using frame-by-frame analysis in accordance with an embodiment of the present subject matter. For an object 1000a at its position at time t, which is approaching the image capture device, its location at time t+1 may be closer to the image capture device than when the object 1000b is at its location at time t+1, and therefore it will appear larger. For an object 1002a at its position at time t and is retreating from the image capture device, its location at time t+1 will be further away when the object 1002b is at its location at time t+1, and therefore it will appear smaller. For motion directly in line with the image capture device center, directionality of the mode measurements of pixel movement on the left, right, top, and bottom centers is indicative of the object (or camera) motion toward or away from the camera. Approaching motion may have a negative motion component on the left and top of the object, and positive on the right and bottom, such that the magnitude between left and right side vectors and between top and bottom vectors can increase. Retreating motion will have the opposite, such that the same magnitudes can decrease. Without loss of generality, any component of the object (or camera) motion that is away from the center line from the object to the camera can result in a translational component that may change the scale of the vectors, but will still maintain the magnitude change relationship. The rate of change these magnitudes, combined with a depth estimation, can be indicative of the velocity of this movement.

The combined motion vectors (MV) of moving objects, defined as objects comprising of pixels that do not follow the global motion movement, can be calculated using "rate of scaling" techniques to calculate motion vectors for movement in depth and traditional motion compensation methods to calculate movement in x and y coordinates. Enlargement of the measurements, during rate of scaling calculations, indicate that objects move closer to the camera, whereas smaller measurement indicate that objects move away from the camera. The rate of change also determines the motion vectors.

The method of FIGS. 5A and 5B further includes identification of occlusion zones resulting from the movement of objects in the scene (step 512). Once the occlusion area is calculated, a search can performed in adjacent frames to identify an accurate representation of such areas. If such areas do not exist, then occlusion zones can be calculated based on suitable techniques.

The method of FIGS. 5A and 5B further includes detection and placement of new objects in the depth plane (step 514). New objects can appear on the scene by either panning the camera left or right, or the objects entering the scene because of their movement. Once a new object is detected, it can be determined whether the object is a static or moving object by, for example, analyzing the motion vectors of the object and comparing the vectors with the motion vectors of the still background objects (step 516). If the objects are static, macro based techniques can be used to determine their depth and frames with large stereo base can be used to create their three-dimensional representation (step 518). If the objects are moving objects, micro based techniques can be used to determine their depth and frames with small stereo base can be used to create their three-dimensional representation after they have properly adjusted for motion (step 520). The recognition of new "objects" entering a given scene may also trigger the creation of a new panning sequence.

The method of FIGS. 5A and 5B includes processing a next frame in the sequence, if there is another frame (step 522). If there is another frame, the method proceeds to step 504. Otherwise, the method includes combining the current panning sequence with the one before by equalizing depth and other 3D parameters (step 524), as well as stabilizing for hand-shaking (step 525), and then processing a next panning sequence, if there is another (step 526). The method may then proceed to step 502 for another panning sequence.

The method of FIGS. 5A and 5B further includes combining the results from the macro- and micro-stereo base calculations to create a three-dimensional model for each frame in the panning sequence of a given scene, with the recognition that a given video sequence may include of multiple panning sequences, with depth equalization between them based on corresponding features (step 524). Each raster pixel for a frame can have an assign (x,y,z) triplet, and can be transformed via perspective projection to a triplet (x',y',z') using a targeted angular rotation about the Y axis or similar view synthesis technique. The screen plane depth may initially be chosen or selected to create the axes for this rotation, and this may be done by selecting a depth from the range represented such that objects in front of the modeled plane are no further than X % of the planes distance closer to the viewer, with a typical value for X being 25%. The target angular rotation may be selected using an approximate viewing location and screen size for the final video, and is chosen to create an ideal stereo base representation of the entire scene and comfortable depth range for the viewer. In an embodiment, this depth range is viewer adjustable from the default settings previously calculated using the aforementioned parameters. Following this transform, multiple pixels are projected back to 2D space for viewing, with the recognition that some pixels may occupy the same space (meaning that the closer is viewed and the further is hidden), or that disparity/depth estimates may not exist for some pixels (in a sparse disparity map embodiment), such that some raster locations may not have assigned pixel values. In the latter case, pixel fill and interpolation methodologies, utilizing data available from previous or subsequent frames in the panning sequence may be performed.

The creation and presentation, such as display, of three-dimensional videos of a scene in accordance with embodiments of the present subject matter may be implemented by a single device or combination of devices. In one or more embodiments of the present subject matter, images may be captured by a camera such as, but not limited to, a digital camera. The camera may be connected to a personal computer for communication of the captured images to the personal computer. The personal computer may then generate one or more three-dimensional videos in accordance with embodiments of the present subject matter. After generation of the three-dimensional images, the personal computer may communicate the three-dimensional videos to the camera for display on a suitable three-dimensional display. The camera may include a suitable three-dimensional display. Also, the camera may be in suitable electronic communication with a high-definition television for display of the three-dimensional videos on the television. The communication of the three-dimensional videos may be, for example, via an HDMI connection.

In one or more other embodiments of the present subject matter, three-dimensional videos may be generated by a camera and displayed by a separate suitable display. For example, the camera may capture conventional two-dimensional images and then use the captured images to generate three-dimensional videos. The camera may be in suitable electronic communication with a high-definition television for display of the three-dimensional videos on the television. The communication of the three-dimensional videos may be, for example, via an HDMI connection.

The subject matter disclosed herein may be implemented by a suitable electronic device having one or more processors and memory, such as a digital still camera, a video camera, a mobile phone, a smart phone, phone, or the like. In order to provide additional context for various aspects of the disclosed subject matter, FIG. 11 and the following discussion are intended to provide a brief, general description of components of a suitable electronic device 1100 in which various aspects of the disclosed subject matter may be implemented. While the present subject matter is described in the general context of computer-executable instructions, such as program modules, executed by one or more computers or other devices, those skilled in the art will recognize that the disclosed subject matter can also be implemented in combination with other program modules and/or as a combination of hardware and software.

Generally, however, program modules include routines, programs, objects, components, data structures, etc. that perform particular tasks or implement particular data types. The operating environment 1100 is only one example of a suitable operating environment and is not intended to suggest any limitation as to the scope of use or functionality of the subject matter disclosed herein. Other well-known computer systems, environments, and/or configurations that may be suitable for use with the subject matter include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 6, an exemplary environment 1100 for implementing various aspects of the present subject matter disclosed herein includes a computer 1102. The computer 1102 includes a processing unit 1104, a system memory 1106, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1106 includes volatile memory 1110 and nonvolatile memory 1112. The basic input/output system (BIOS), containing the basic routines to transfer information between elements within the computer 1102, such as during start-up, is stored in nonvolatile memory 1112. By way of illustration, and not limitation, nonvolatile memory 1112 can include read only memory (ROM), programmable ROM (PROM), electrically programmable ROM (EPROM), electrically erasable ROM (EEPROM), or flash memory. Volatile memory 1110 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 602 also includes removable/nonremovable, volatile/nonvolatile computer storage media. FIG. 6 illustrates, for example, disk storage 1114. Disk storage 1114 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or nonremovable interface is typically used such as interface 1116.

Figure 11:
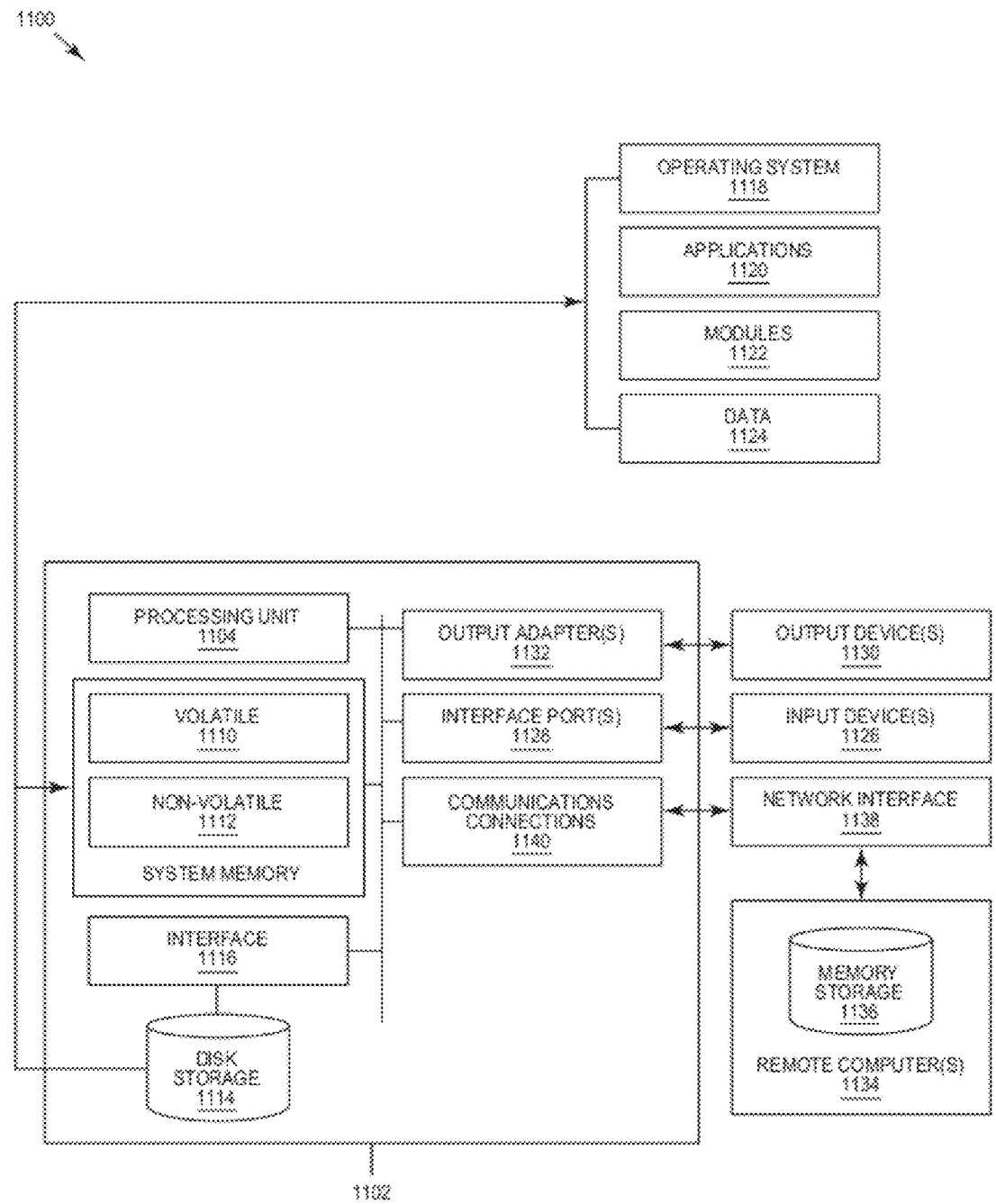
FIG. 11 illustrates an exemplary environment for implementing various aspects of the subject matter disclosed herein.

It is to be appreciated that FIG. 11 describes software that acts as an intermediary between users and the basic computer resources described in suitable operating environment 1100. Such software includes an operating system 1118. Operating system 1118, which can be stored on disk storage 1114, acts to control and allocate resources of the computer system 1102. System applications 1120 take advantage of the management of resources by operating system 1118 through program modules 1122 and program data 1124 stored either in system memory 1106 or on disk storage 1114. It is to be appreciated that the subject matter disclosed herein can be implemented with various operating systems or combinations of operating systems.

A user enters commands or information into the computer 1102 through input device(s) 1126. Input devices 1126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1128. Interface port(s) 1128 include, for example, a serial port, a parallel port, a game port, and a universal serial bus (USB). Output device(s) 1130 use some of the same type of ports as input device(s) 1126. Thus, for example, a USB port may be used to provide input to computer 1102 and to output information from computer 1102 to an output device 1130. Output adapter 1132 is provided to illustrate that there are some output devices 1130 like monitors, speakers, and printers among other output devices 1130 that require special adapters. The output adapters 1132 include, by way of illustration and not limitation, video and sound cards that provide a means of connection between the output device 1130 and the system bus 1108. It should be noted that other devices and/or systems of devices provide both input and output capabilities such as remote computer(s) 1134.

Computer 1102 can operate in a networked environment using logical connections to one or more remote computers, such as remote computer(s) 1134. The remote computer(s) 1134 can be a personal computer, a server, a router, a network PC, a workstation, a microprocessor based appliance, a peer device or other common network node and the like, and typically includes many or all of the elements described relative to computer 1102. For purposes of brevity, only a memory storage device 1136 is illustrated with remote computer(s) 1134. Remote computer(s) 1134 is logically connected to computer 1102 through a network interface 1138 and then physically connected via communication connection 1140. Network interface 1138 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1140 refers to the hardware/software employed to connect the network interface 1138 to the bus 1108. While communication connection 1140 is shown for illustrative clarity inside computer 1102, it can also be external to computer 1102. The hardware/software necessary for connection to the network interface 1138 includes, for exemplary purposes only, internal and external technologies such as, modems including regular telephone grade modems, cable modems and DSL modems, ISDN adapters, and Ethernet cards.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the subject matter. When implemented on a general-purpose processor, the program code combines with the processor to provide a unique apparatus that operates to perform the processing of the present subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for creating a three-dimensional video sequence of a scene, the method comprising:
utilizing a two-dimensional video sequence of a scene, the two-dimensional video sequence including a plurality of frames;
selecting a target frame from among the plurality of frames;
selecting a first subset of frames, N, from among the plurality of frames that are associated with the target frame;
identifying and classifying static and moving objects utilizing the first subset of frames;
extracting depth data of static objects utilizing the first subset of frames;
selecting a second subset of frames, n, from among the plurality of frames that are associated with the target frame, representative of a stereo displacement that is substantially different than the displacement represented by N;

utilizing the second subset of frames to calculate depth of moving objects at the time of the target frame; and combining the depth values of static and moving objects to generate a three-dimensional video frame.

2. The method of claim 1, further comprising one or more steps of identifying suitable frames, registration, stabilization, color correction, transformation, and depth adjustment.

3. The method of claim 1, further comprising generating one or more additional frames and frame viewpoints using one of existing raster data and depth information.

4. The method of claim 1, further comprising using a micro stereo base technique for generating image representations of close and moving objects of the scene.

5. The method of claim 1, further comprising using a macro stereo base technique for generating image representations of a background and non-moving objects of the scene.

6. The method of claim 1, further comprising using an image capture device for capturing the two-dimensional video sequence.

7. The method of claim 1, further comprising using the steps of claim 1 for generating a plurality of three-dimensional video frames.

8. The method of claim 1, further comprising dividing the captured two-dimensional video sequence into segments divided by utilizing one of a scene change detection and camera pose information.

9. The method of claim 8, further comprising creating a stereoscopic video sequence from each segment.

10. The method of claim 9, further comprising equalizing the depths and other three-dimensional parameters and combining the individual stereoscopic segments to form a single three-dimensional video stream.

11. The method of claim 1, further comprising analyzing captured frames to measure object displacements between two or more frames via motion vectors and identifying and classifying static and moving objects within the current target frame.

12. The method of claim 1, further comprising:
analyzing captured frames; and
identifying a position of key static objects to estimate the position of the camera.

13. The method of claim 1, further comprising measuring the motion vectors of the moving objects and estimating their relative position on the x, y space.

14. The method of claim 1, further comprising:
measuring sizes of moving objects; and
estimating their relative position on the z-space based on the rate of increase or decrease of their sizes.

15. The method of claim 1, further comprising estimating the depth of moving objects by identifying the depth of key points of moving objects relative to the depth of neighboring static objects with known depths and extrapolating based on temporal or structural relationships.

16. The method of claim 1, further comprising estimating the depth of moving objects by determining whether they are moving behind or in front of static objects and utilizing the depth of static objects to estimate the depth of a moving object based on the moving object's trajectory in time.

17. The method of claim 1, further comprising:
segmenting the static portions of the scene into static objects with known positions in three-dimensional space and utilizing prediction techniques to estimate the depth of new information entering into the captured video sequence associated with the same or related static objects.

18. The method of claim 1, further comprising:
measuring sizes of static objects; and
estimating changes in camera focal length and adjusting the depth of the scene based on the relative zoom factor of the camera based on their relative rate of increase or decrease over time.

19. A system for creating a three-dimensional video sequence of a scene, the system comprising:
a memory having stored therein computer program code;
a computer processor that executes the computer program code;
a video generator configured to:
receive a two-dimensional video sequence of a scene, the two-dimensional video sequence including a plurality of frames;
select a target frame from among the plurality of frames;
select a first subset of frames, N, from among the plurality of frames that are associated with the target frame;
extract depth data of static objects utilizing the first subset of frames;
select a target frame from among the plurality of frames;
select a second subset of frames, n, from among the plurality of frames that are associated with the target frame, representative of a stereo displacement that is substantially different than the displacement represented by N;
utilize the second subset of frames to calculate depth of moving objects at the time of the target frame; and
combine the depth values of static and moving objects to generate a three-dimensional video frame.

20. The system of claim 19, wherein the video generator is configured to implement one or more functions of identifying suitable frames, registration, stabilization, color correction, transformation, and depth adjustment.

21. The system of claim 19, wherein the video generator is configured to generate one or more additional frames and frame viewpoints using one of existing raster data and depth information.

22. The system of claim 19, wherein the video generator is configured to use a micro stereo base technique for generating image representations of close and moving objects of the scene.

23. The system of claim 19, wherein the video generator is configured to use a macro stereo base technique for generating image representations of a background and non-moving objects of the scene.

24. The system of claim 19, comprising an image sensor and a lens configured to capture the two-dimensional video sequence.

25. The system of claim 19, wherein the video generator is configured to generate a plurality of three-dimensional video frames using the functions implemented by the video generator recited in claim 9.

26. The system of claim 25, comprising a display configured to display the plurality of three-dimensional video frames in a sequence.

27. A computer program product for creating three-dimensional video sequence, the computer program product comprising:
a non-transitory computer readable storage medium having computer readable program code embodied therewith, the non-transitory computer readable program code comprising:

computer readable code configured to receive a two-dimensional video sequence of a scene, the two-dimensional video sequence including a plurality of frames;
computer readable code configured to select a target frame from among the plurality of frames;
computer readable code configured to select a first subset of frames, N, from among the plurality of frames that are associated with the target frame;
computer readable code configured to identify and classify static and moving objects using the first subset of frames;
computer readable code configured to extract depth data of static objects utilizing the first subset of frames;
computer readable code configured to select a second subset of frames, n, from among the plurality of frames that are associated with the target frame, representative of a stereo displacement that is substantially different than the displacement represented by N;
computer readable code configured to utilize the second subset of frames to calculate depth of moving objects at the time of the target frame; and
computer readable code configured to combine the static and moving objects to generate a three-dimensional video frame.

28. The computer program product of claim 27, wherein the computer readable program code comprises computer readable code to implement one or more steps of identifying suitable frames, registration, stabilization, color correction, transformation, and depth adjustment.

29. The computer program product of claim 27, wherein the computer readable program code comprises computer readable code to generate one or more additional frames and frame viewpoints using one of existing raster data and depth information.

30. The computer program product of claim 27, wherein the computer readable program code comprises computer readable code to use a micro stereo base technique for generating image representations of close and moving objects of the scene.

31. The computer program product of claim 27, wherein the computer readable program code comprises computer readable code to use a macro stereo base technique for generating image representations of a background and non-moving objects of the scene.

32. The computer program product of claim 27, wherein the computer readable program code comprises computer readable code to use an image capture device for capturing the two-dimensional video sequence.

33. The computer program product of claim 27, wherein the computer readable program code comprises computer readable code to generate a plurality of three-dimensional video frames.

34. The computer program product of claim 33, wherein the computer readable program code comprises computer readable code to control a display to display the plurality of three-dimensional video frames in a sequence.

* * * * *